US007425968B2

(12) United States Patent
Gelber

(10) Patent No.: US 7,425,968 B2
(45) Date of Patent: Sep. 16, 2008

(54) SYSTEM AND METHOD FOR LABELING MAPS

(76) Inventor: Theodore J. Gelber, 455 Crescent Ave., #48, Sunnyvale, CA (US) 94087

( * ) Notice: Subject to any disclaimer, the term of this patent is extended or adjusted under 35 U.S.C. 154(b) by 392 days.

(21) Appl. No.: 10/462,044

(22) Filed: Jun. 16, 2003

(65) Prior Publication Data

US 2004/0252137 A1 Dec. 16, 2004

(51) Int. Cl.
*G06T 11/60* (2006.01)
(52) U.S. Cl. .................................... 345/629
(58) Field of Classification Search ................. 715/790, 715/794; 345/629, 636
See application file for complete search history.

(56) References Cited

U.S. PATENT DOCUMENTS

| 5,191,644 | A | * | 3/1993 | Takeda | 345/790 |
|---|---|---|---|---|---|
| 5,483,258 | A | * | 1/1996 | Cornett et al. | 345/622 |
| 5,684,940 | A | | 11/1997 | Freeman | |
| 5,841,420 | A | * | 11/1998 | Kaply et al. | 345/421 |
| 6,091,424 | A | | 7/2000 | Madden | |
| 6,154,219 | A | * | 11/2000 | Wiley et al. | 345/587 |
| 6,320,577 | B1 | * | 11/2001 | Alexander | 345/440.1 |
| 6,424,933 | B1 | * | 7/2002 | Agrawala et al. | 703/2 |

OTHER PUBLICATIONS

I.E. Sutherland, R.F. Sproull, R.A. Schumacker: A Characterizatoin of Ten Hidden-Surface Algorithms Jan. 1974, ACM Computing Surveys (CSUR), vol. 6 Issue 1 p. 12.*
Paul Bourke: Determining if a Opint Lies on the Interior of a Polygon 1996, http://astronomy.swin.edu.au/~pbourke/geometry/insidepoly/ p. 1-6.*
Jon Christensen, Joe Marks, and Stuart Shieber An Empirical Study of Algorithms for Point-Feature.
Algorithm Mitsubishi Electric Research Laboratories, Cambridge Research Center.
Paul Bourke Determining if a Point Lies on the Interior of a Polygon.

* cited by examiner

*Primary Examiner*—Jeffery A. Brier
(74) *Attorney, Agent, or Firm*—David Tichane

(57) ABSTRACT

A system and method for label placement is disclosed that achieves the twin goals of practical efficiency and high labeling quality by employing cartographic heuristics. A caller defines map and label properties. Then labels are pulled within a map boundary. Labels are next ordered by priority in descending importance. The order of testing labels is determined. Attempts are made to move overlapping labels. This is an iterative process; therefore there must be criteria that halt the procedure. Upon reaching an acceptable solution, the label properties are adjusted to reflect the new label placements.

8 Claims, 16 Drawing Sheets

90

SYSTEM AND METHOD FOR LABELING MAPS

FIELD OF THE INVENTION

The present invention relates to a computer-implemented method and apparatus for automatically labeling maps or graph layouts in accordance with predefined label criteria.

BACKGROUND OF THE INVENTION

Maps include geographic drawings showing countries, cities, rivers, bodies of water, mountains, and other features of interest. Labeling cartographic features is a fundamental part of map-making. Placing each label optimally with respect to its corresponding feature invariably produces labels overlapping each other or too close to each other. As this results in confusion and unacceptable maps, methods to reposition labels or not draw them at all must be used to create a map that conveys as much information as possible.

Tagging graphical objects with text labels is a fundamental task in the design of many types of informational graphics. This problem is seen in its most essential form in cartography, but it also arises frequently in the production of other informational graphics such as scatter plots. The quality of a labeling is determined essentially by the degree to which labels obscure other labels or features of the underlying graphic. The goal is to choose positions for the labels that do not give rise to label overlaps and that minimize obscuration of features. Construction of a good labeling is thus a combinatorial optimization problem, which has been shown to be NP-hard (Marks and Shieber, 1991). As a hypothetical baseline algorithm, randomly choosing positions for each label generates a poor labeling, both aesthetically, and as quantified using a metric that counts the number of conflicted labels, i.e., those that obscure point features or other labels.

In addition to geographical and technical maps, there are many labeling applications relating to graph layouts and drawings. These applications include, but are not limited to, areas such as database design (e.g. entity relationship diagrams), software engineering including CASE, software debugging, complex web pages, CAD drafting, complex electrical diagrams, and telecommunications and communications networking. In fact, the labeling of the graphical features of any drawing is generally necessary because it conveys information essential to understanding the drawing. For complex and information rich drawings, computer aided labeling is increasingly employed.

As used in the present specification, the term "map" is used to include both geographical and technical maps as well as graph layouts and drawings. The term "label" is used to refer to text or other indicia to be placed on a map.

A system and method for labeling objects on maps while avoiding collisions with other labels has been sought after. Some apparently powerful algorithms for automatic label placement on maps use heuristics that capture considerable cartographic expertise but are hampered by provably inefficient methods of search and optimization.

This patent discloses a system and method for label placement that achieves the twin goals of practical efficiency and high labeling quality by employing cartographic heuristics.

SUMMARY OF THE INVENTION

The present invention provides a computer-implemented system and method of automatically labeling a map in accordance with predefined label location, placement, and priority criteria.

Here, each label is represented as a convex polygon with any orientation on the map. Labels have various parameters associated with them such as location, size, shape, number and location of vertices, target feature, priority, movement constraints, and clearance. After finding the best position of a label for every feature without regard to other labels or features, higher priority label positions are compared to lower priority label positions two at a time. If the labels interfere, the lower priority label is moved within its movement constraint. Several candidate locations for the lower priority label position are found by moving it the shortest distance to avoid the higher priority label position. A new location is acceptable if the location does not collide with a label of higher priority. It can collide with a label of lower priority. If no candidate positions are acceptable, the label is not moved. This process continues until all labels are inspected, after which a deviation from the desired result function is calculated. This function is zero if the label interference for all labels is zero and greater than zero otherwise. The whole process is repeated until the evaluation function equals zero or the change in the evaluation function is less than a given percent (e.g., two percent) for a small number (e.g., four) of iterations or if it oscillates for a number (e.g., six) of iterations or if the number of iterations is greater than a set number (e.g., twenty). If any interference remains, then interfering labels with lower priorities are not drawn.

The details of the present invention, both as to its structure and operation, can best be understood in reference to the accompanying drawings, in which like reference to the accompanying drawings, in which like reference numerals refer to like parts, and in which:

DETAILED DESCRIPTION OF THE PREFERRED EMBODIMENTS

Figures 1, 2:
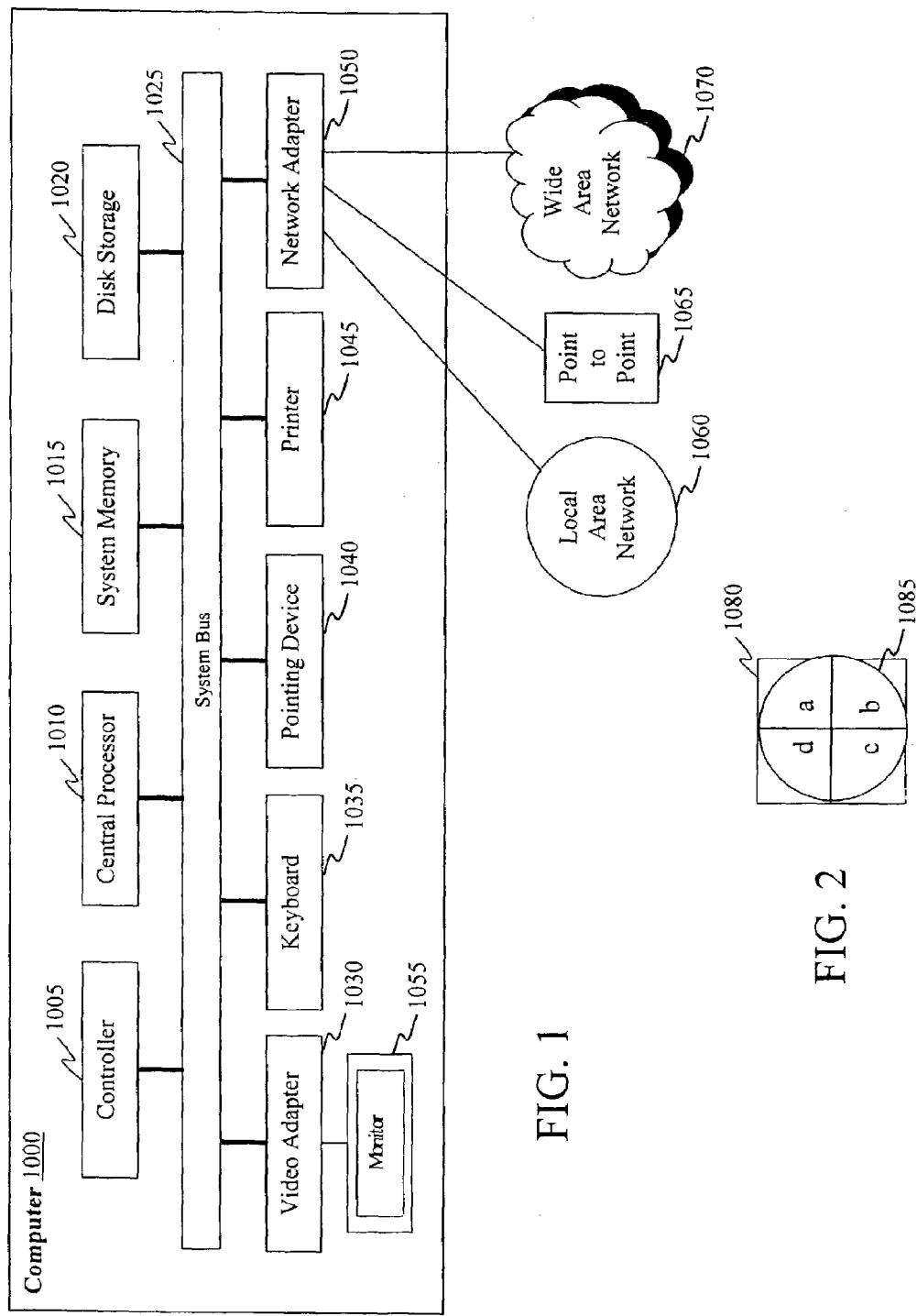
FIG. 1 is a diagram of a computer hardware architecture compatible with the present system and method.
FIG. 2 is a schematic diagram showing an exemplary computer program product.

Referring initially to FIG. 1, a system is shown which includes a digital processing apparatus. This system is a general-purpose computer 1000. The computer may include a graphics display, print hardware, and print software, or may be as simple as a generic personal computer. The example computer in FIG. 1 includes central processor 1010, system memory 1015, disk storage 1020 (e.g., hard drive, floppy drive, CD-ROM drive, or DVD drive), controller 1005, network adapter 1050, video adapter 1030, and monitor 1055. Data input may be through one or more of the following agencies: keyboard 1035, pointing device 1040, disk storage 1020, local area network 1060, point to point communications 1065, and wide area network 1070 (e.g., internet).

One or more features of the computer as shown may be omitted while still permitting the practice of the invention. For example, printer 1045 is not necessary for maps intended to be displayed only on monitor 1055. Likewise, network adapter 1050, local area network 1060, point to point communications 1065, and wide area network 1070 are not necessary when the primary method of data input is via removable disk storage.

The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

FIG. 2 shows a computer program product which includes a disk 1080 having a computer usable medium 1085 thereon for storing program modules a, b, c, and d. While 4 modules are shown in FIG. 2, it is to be understood that the number of modules into which the program is divided is arbitrary and may be in any particular embodiment a different number.

Modules a, b, c, d may be a computer program that is executed by processor 1010 within the computer 1000 as a series of computer-executable instructions. In addition to the above-mentioned disk storage 1020, these instructions may reside, for example in RAM or ROM of the computer 1000 or the instructions may be stored on a DASD array, magnetic tape, electronic read-only memory, or other appropriate data storage device. In an illustrative embodiment of the invention, the computer-executable instructions may be lines of compiled C++ code.

Figure 3:
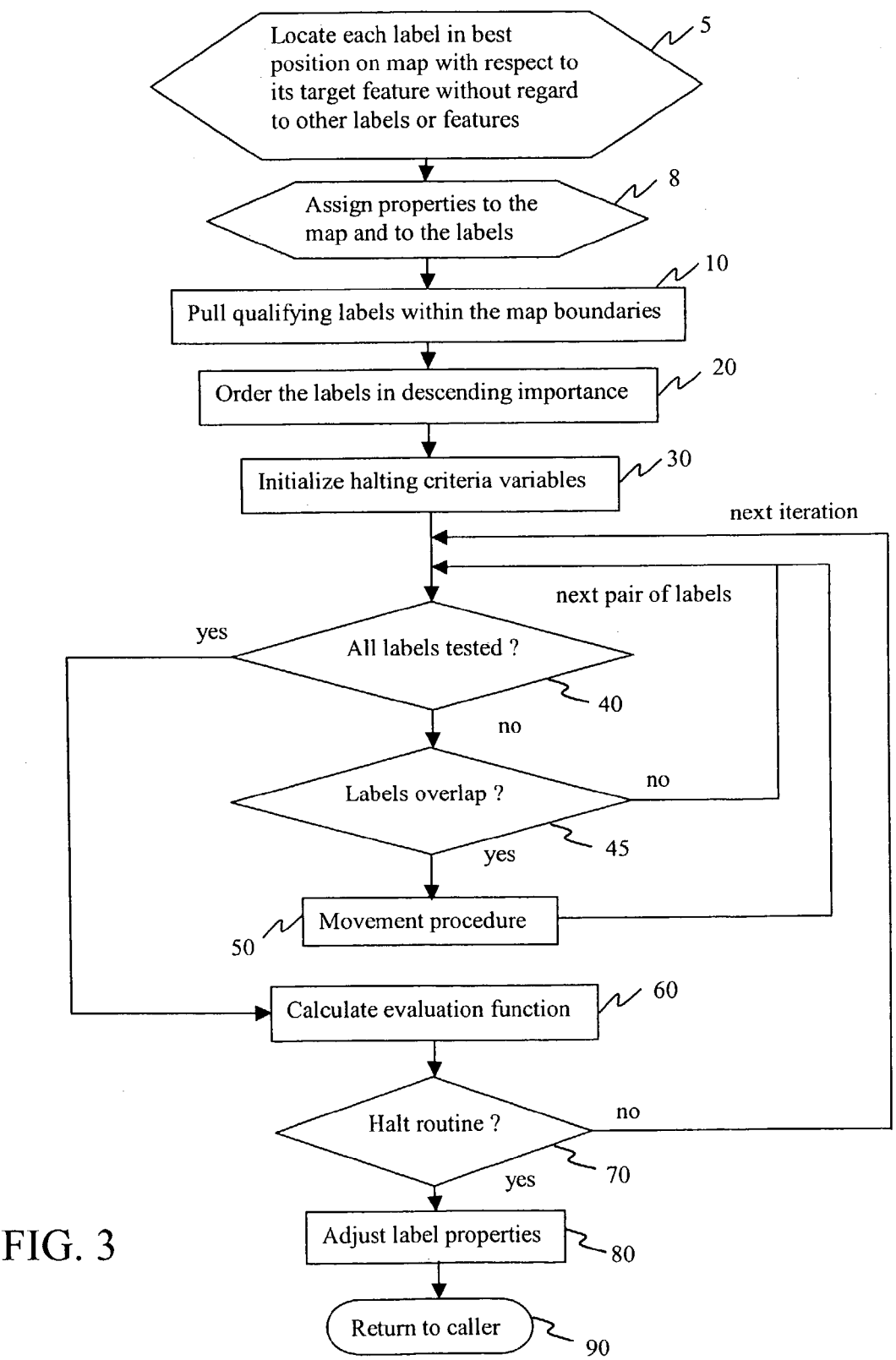
FIG. 3 is a flow chart showing the overall logic of the present system and method.

FIG. 3 is an overview and summary of the label anti-collision procedure for maps. The caller of the procedure performs the first stage, routine 5, and the second stage, routine 8. Routine 5 involves locating each label on a map in the optimal position with respect to its target feature without regard to other labels or features. Routine 8 assigns properties to the map and the labels.

To begin, the user must specify how to initially place labels on a map. That is, commencing at routine 5, it is assumed that the user will assign positions that give the best label location with respect to its associated feature. For this procedure to work, the user places the labels in the best spots according to their criteria regardless of other labels and map features. For example, in the initial positions, labels may overlap each other and/or extend over the map boundary. Labels are assumed to be convex polygons while the map boundary is assumed to be a rectangle.

Next, at routine 8, the user must assign properties to the map and the labels. Map properties include its height and width. A label's properties include the associated map feature(s), initial location, size, shape, angular orientation, priority, movement constraints, and clearance. In addition, each label has an associated property that indicates the fraction of the label area that can extend outside the map boundary before it is not drawn. The procedure takes all of these properties into account to move labels to acceptable positions or to not draw the label.

The following discussion concerns only those geometric objects in the plane of the map, of which the labels are a part. All labels are restricted to convex planar polygons in this plane. A planar polygon is convex if it contains all the line segments connecting any pair of its points. If two convex planar polygons overlap, this means that:

1) at least one vertex of one polygon is inside the other polygon, or
2) at least one edge of one polygon crosses or touches (i.e., intersects) an edge of the other polygon.

To begin the anti-collision procedure, three initialization steps occur. First, labels lying partially inside the map boundary must either be moved completely inside the portrait or be excluded from being compared to other labels and excluded from being drawn. Each label has movement types and constraints that determine whether or not the label qualifies for movement completely onto the map. These movement types and constraints are explained below. Labels qualifying for movement to the inside of the map are moved regardless of the collision status with any other label.

Second, the labels must be ordered in a list with respect to priority from highest priority to lowest priority. In general, many labels will have the same priority. Within any group of labels with the same priority, any particular label is randomly placed within that block.

Third and last, variables that monitor the state of the procedure must be initialized.

The purpose of routine 10 is to move labels within the map boundary. If too much of a label is outside the boundary, it will not be included in the map. Each label is tested to determine what fraction of its area is within the map boundary.

At routine 20, labels are sorted in order of descending priority. Halting criteria parameters are initialized at routine 30.

Every combination of two labels is tested for overlap in routine 40. When comparing labels to determine if they overlap, it is important to choose the order of comparison properly to avoid excessive calculation and moving labels more times than necessary. The highest priority labels should be tested for overlap before labels of lower priority.

The overlap test at routine 45 has three parts. First, it must be determined if any vertex of a first label is inside the second label. Second, it must be determined if any vertex of a second label is inside the first label. Third, it must determine if any edge of the first label intersects any edge of the second label. If at any point either label is determined to overlap the other label, then any remaining parts are bypassed.

Labels are moved about the map at routine 50 to clear existing label collisions. After it is determined that two labels overlap, the routine finds several new locations for the lower priority of the two labels that eradicate the existing overlap. These locations are ranked by how far the label must be moved, shortest to longest. Then if appropriate, the lower priority is moved to a new location, and its location parameters are adjusted.

The evaluation function, routine 60, quantifies the extent of label collisions. Routines 40, 45, 50, and 60 iterate until halt routine criteria 70 are satisfied. Labels may move several times before the iterations stop.

After the iterations stop, all labels are examined for any overlap and label properties are adjusted at routine 80. Finally, control is returned at routine 90 to the user to draw or view the map.

Figure 4A:
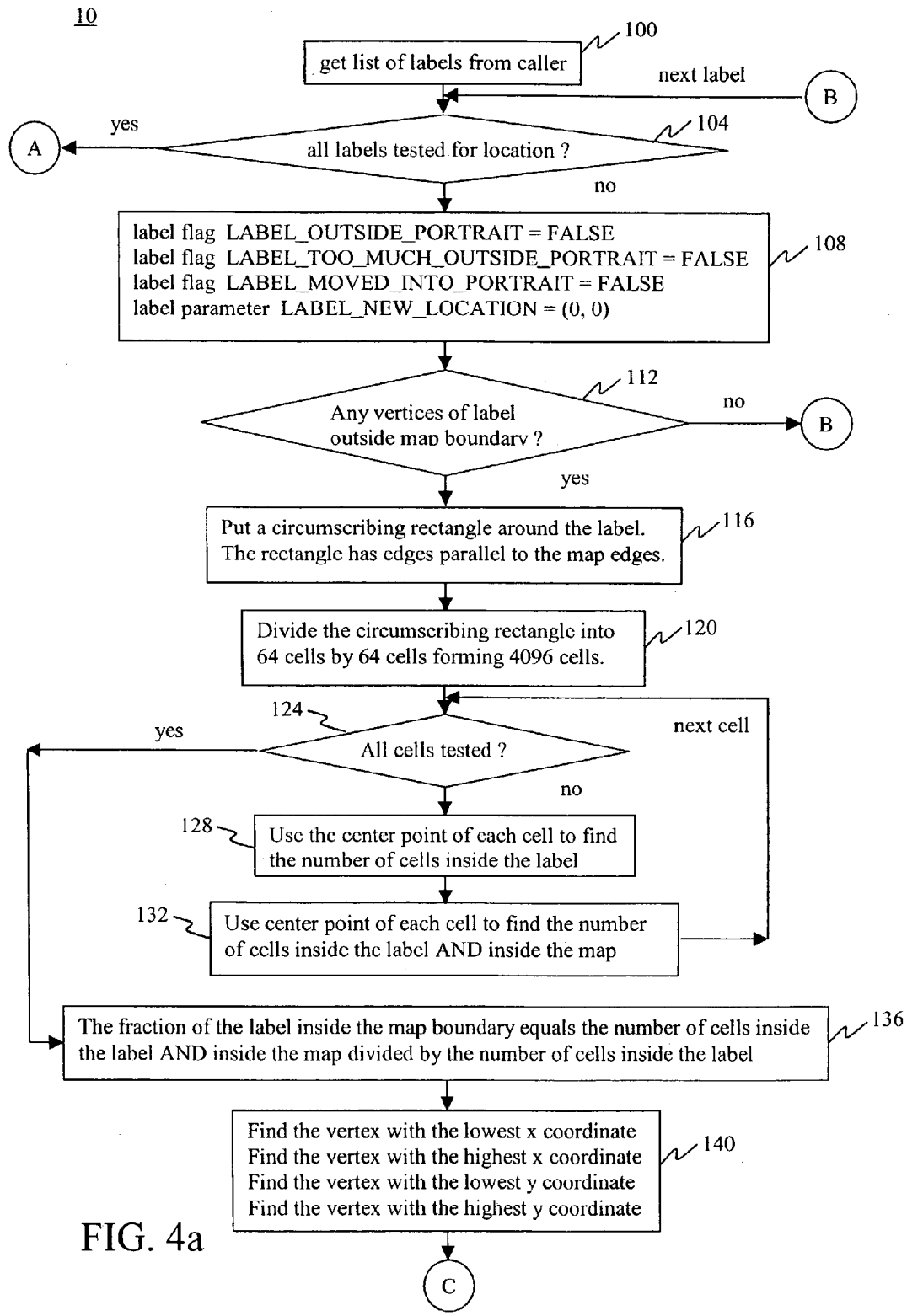
FIGS. 4a, 4b, and 4c is a flow chart showing the initialization of the anti-collision system and method.
Figure 4B:
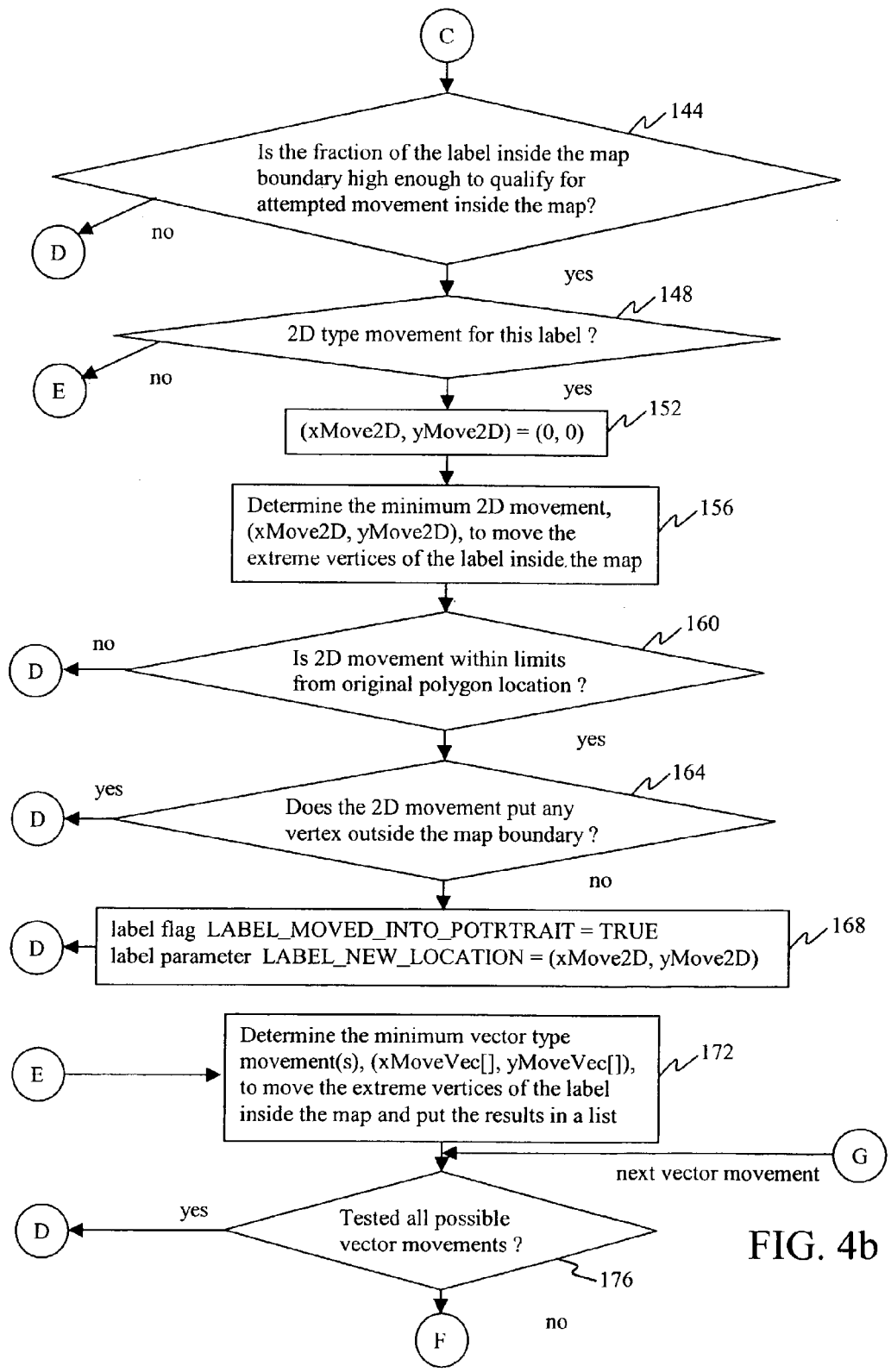
Figure 4C:
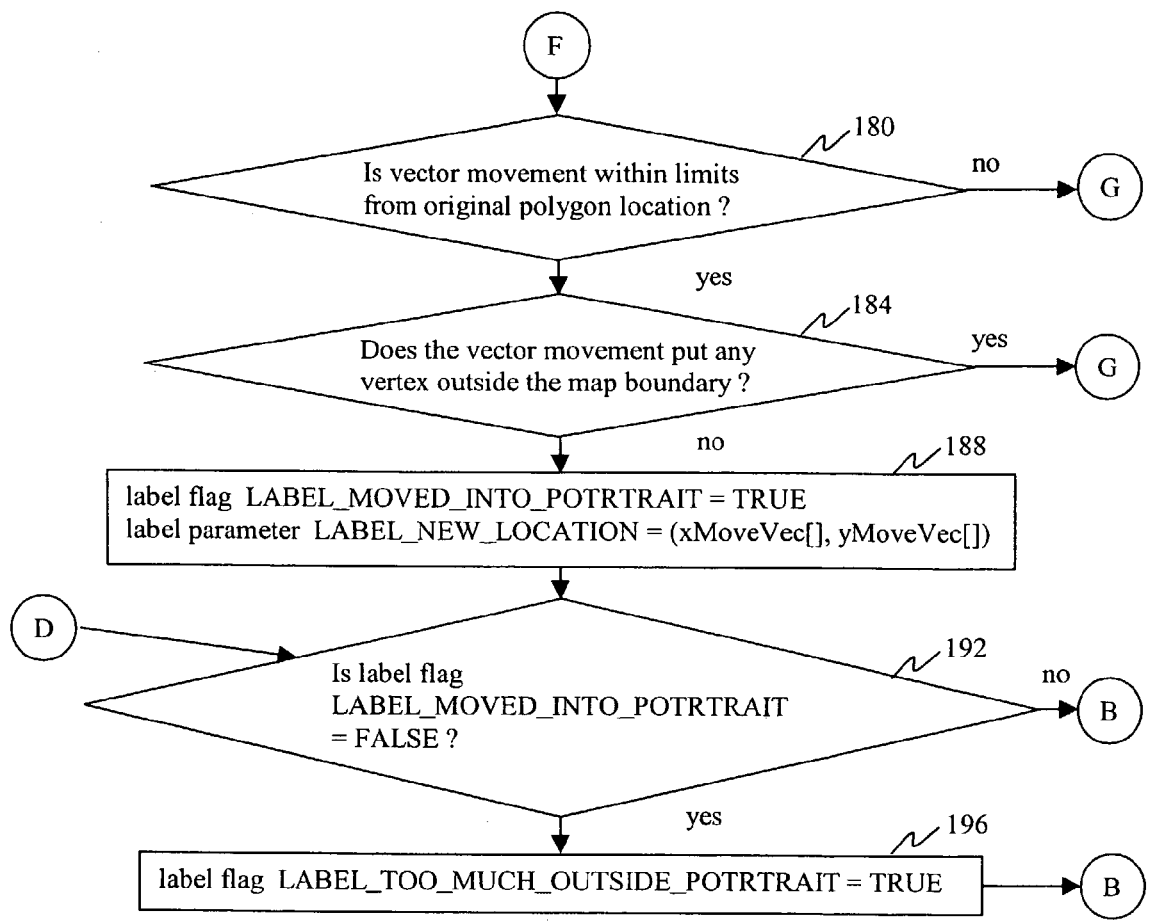

FIGS. 4a, 4b, and 4c display the logic of routine 10 in detail. The purpose of routine 10 is to make sure all of a label is within the map boundary. If too much of a label is outside the boundary, it will not be included in the map. Each label is tested to determine what fraction of its area is within the map boundary. A particular label is divided into a grid; 32 by 32 cells is a typical division that works well in practice. If the centroid of a cell is within the map boundary, the entire cell contributes to the fraction of the label within the boundary. The areas of each cell within the map are added to together. If this sum of cell areas, divided by the total label area, is greater than a predetermined value, then the label is moved entirely onto the map according to the movement procedure and the movement constraints described below. The only change to the procedure is that there is no test for overlap with other labels. The qualifying labels are moved onto the map at this time and tested later.

Step 100 obtains a list of labels from data storage. Each label is tested for whether the entire label is inside the map boundary. First, step 108 initializes flags that will be used in routine 10. Step 112 tests whether vertices of each label are outside the map boundary. If the vertices of a label are all inside the map boundary, then the next label is tested. If any vertices of a label are outside the map boundary, then, at step 116, a circumscribing rectangle is placed around the label. Then the circumscribing rectangle is divided into a plurality of cells at step 120. For example, the rectangle may be divided into 64 cells by 64 cells forming a total of 4096 cells.

Each cell is tested, step 124. The test includes finding the center point of each cell to find the number of cells inside the label, step 128. Then, at step 132, the center point of each cell used to find the number of cells both inside the label and inside the map.

The fraction of the label inside the map boundary is determined at step 136. The high and the low values of the x and y coordinates for the vertices of the label are found in step 140. Then the label is tested, step 144, to determine if the fraction of the label inside the map boundary is high enough to qualify for attempted movement inside the map. There is one of two possible ways the label might move depending on its movement constraints, which is determined in step 148. One movement, in both the x-axis and y-axis direction, is performed in steps 152, 156, 160, 164, and 168. The other movement, restricted to a vector, is performed in steps 172, 176, 180, 184, and 188. If the label is partially or totally outside the map, and cannot be properly moved within the map, which is checked in step 192, then a parameter for that label is set in step 196.

Once all labels have been tested, step 104 exits routine 10 and proceeds to routine 20.

Figure 5:
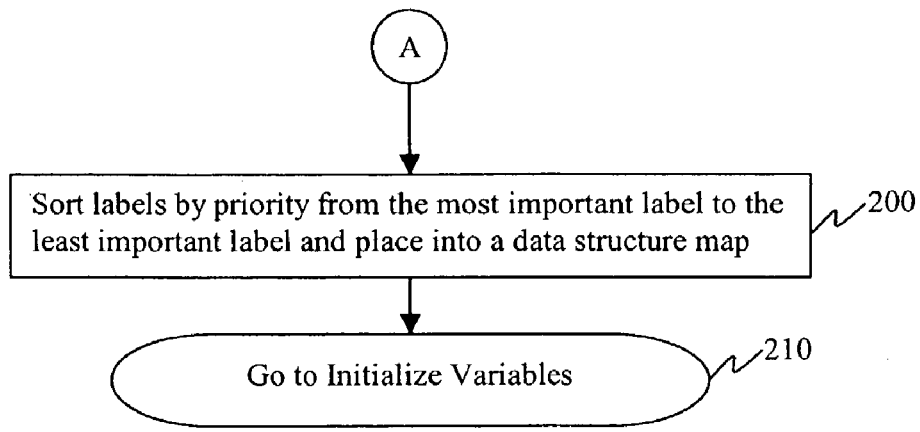
FIG. 5 is a flow chart of the sorting labels by priority.

Referring to FIG. 5, labels are sorted by priority at step 200 from the highest priority label to the lowest priority label and placed into a data structure map. Step 210 exits routine 20 and proceeds to routine 30, an initialization of halting criteria variables.

Figure 6:
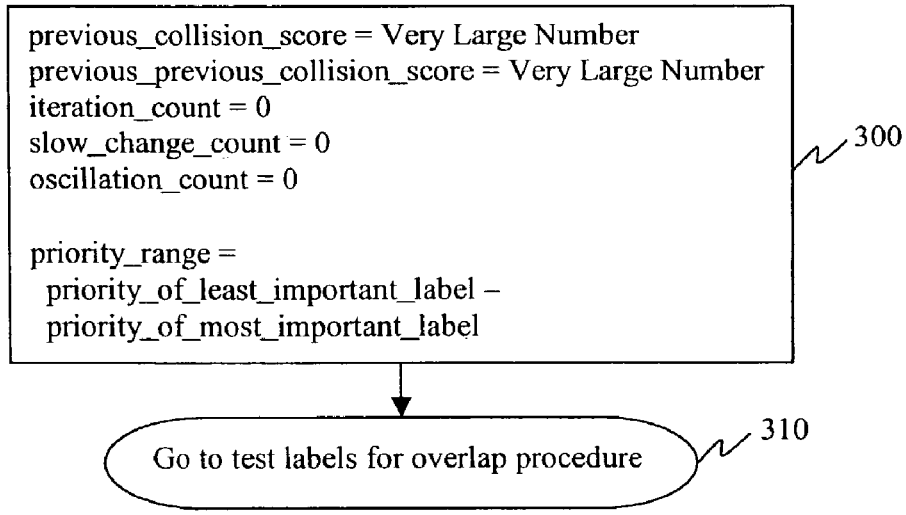
FIG. 6 is a flow chart showing the initialization of halting criteria variables.
Figures 10, 11:
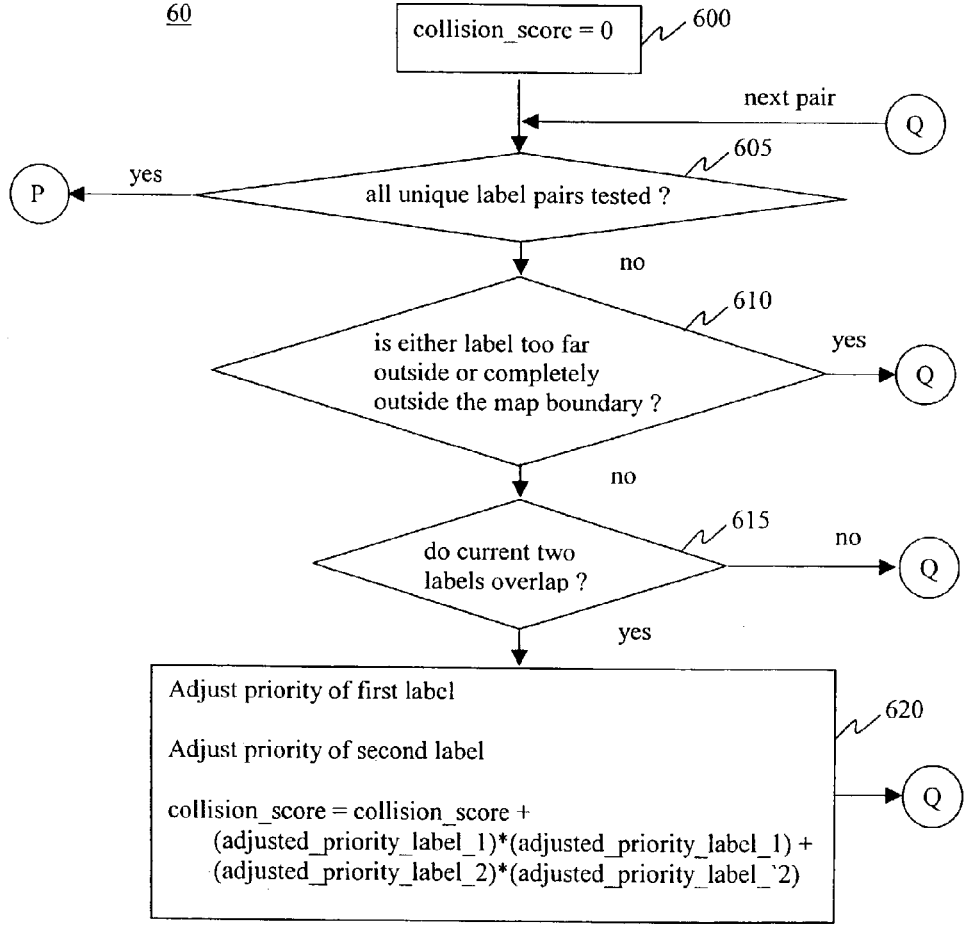
FIG. 10 is a flow chart showing the initiation of collision scores and priority ranges.
FIG. 11 is a flow chart showing the calculation of the evaluation function.

In FIG. 6, step 300 initializes halting criteria variables. Step 310 exits routine 30 and proceeds to routine 40, a test of every combination of two labels for overlap. Another expression for halting criteria variables is collision scores and priority ranges, as shown in FIG. 10, step 590.

The above-described logic is further shown in the following pseudo-code with comments:

PULL IN THE LABELS FROM THE EDGES OF THE MAP ROUTINE

```
//Pseudo-code for the Initialization of the Anti-collision Procedure
for Maps
//List of pseudo-code variables
previous_collision_score - the collision score from the previous
iteration
previous_previous_collision_score - the collision score from two
iterations ago
iteration_count - number of times the anti-collision procedure has
looped
slow_change_count - number of iterations of continuous slow change of
collision score
oscillation_count - number of iterations of continuous oscillation of
collision score
priority_of_most_important_label - numerical priority value of the most
important label
priority_range - the difference between the priority of the least and
the most important labels. This number is non-negative.
frac_inside - fraction of label inside the map boundaries
map_x_size - the number of x units in the map - map boundary is a
rectangle
map_y_size - the number of y units in the map - map boundary is a
rectangle
(xMove2D, yMove2D) - the label movement if the label qualifies for
movement completely inside the map boundary and the label parameters
specify 2D type movement
(xMoveVec[], yMoveVec[]) - an array of label movements if the label
qualifies for movement completely inside the map boundary and the label
parameters specify vector type movement
(xc, yc) - center point of a cell formed from a grid within the
circumscribing rectangle around the label
(x_IP, y_IP) - a point satisfying various conditions used to properly
move a label completely inside the map boundary
LABEL_TOO_MUCH_OUTSIDE_PORTRAIT - indicates
if the procedure has
determined that the label has much area outside the map boundary or can
not be properly moved to a new position completely inside the map
boundary. This is a flag of every label set by the procedure.
LABEL_OUTSIDE_PORTRAIT - Not used. This is
a flag of every label set by the procedure.
LABEL_MOVED_INTO_PORTRAIT - indicates
if the procedure has moved a
label that was originally partially outside the map boundary to a new
position completely inside the map boundary. This is a flag of every
label set by the procedure.
LABEL_MIN_FRACTION_INSIDE - minimum fraction
of the label that must be
inside the map boundary to attempt relocation completely inside the map
boundary. This is a parameter of every label set by caller.
LABEL_NEW_LOCATION - A vector (x, y)
which is added to all vertices of
a label if the procedure moves the label. This vector has an initial
value of (0, 0) . This is a parameter of every label determined by the
procedure.
// pseudo-code also has:
// a list of possible label movement candidates to pull the label
inside the map boundary
// a data structure map of labels and their properties sorted by
priority from the most
// important label to the least important label
------------------------------------------------------------
// THIS IS THE START OF ROUTINE 10
// The labels are not in any particular order at this point.
// They are only in the order in which they are received from the
caller.
for i = first unordered label to last unordered label
    set label i flag LABEL_OUTSIDE_PORTRAIT = FALSE
    set label i flag
    LABEL_TOO_MUCH_OUTSIDE_PORTRAIT = FALSE
    set label i flag LABEL_MOVED_INTO_PORTRAIT = FALSE
    set label i parameter LABEL_NEW_LOCATION = (0, 0)
    // Determine if the label is inside or outside the map boundary.
    // If all vertices are inside, then the entire label is inside.
    // Here, a vertex on the map boundary is inside the boundary.
    label_inside_map = TRUE
    for j = first vertex of label i to last vertex of label i
        if ( vertex j outside map boundary ) {
            label_inside_map = FALSE
```

-continued

PULL IN THE LABELS FROM THE EDGES OF THE MAP ROUTINE

```
        }
    next j
    if ( label_inside_map = FALSE ) {
        // Below, find the approximate fraction of the label inside the map
boundary.
        // The circumscribing rectangle has edges parallel to the map edges.
        // Note that both the rectangle and the label are convex polygons.
        Put a circumscribing rectangle around label i
        Divide the circumscribing rectangle into 64 units by 64 units forming
4096 cells
        in_label = 0
        in_label_and_map = 0
        for k = first cell to last cell
            Find center point of cell k called (xc, yc)
            // Here, a point on a label edge or map boundary is inside the label
or map.
            // Use the "point inside convex polygon" procedure described in the
            // labels overlap section.
            if( (xc, yc) inside label ) {
                in_label = in_label + 1
                if( (xc, yc) inside map boundary ) {
                    in_label_and_map = in_label_and_map + 1
                }
            }
        next k
        frac_inside = ( in_label_and_map )/( in_label )
        // Move the label inside the map boundary if enough of the label is
inside.
        // Some of the vertices below may be the same vertex.
        (x_low, yL) = coordinates of vertex with lowest x coordinate
        (x_high, yH) = coordinates of vertex with highest x coordinate
        (xL, y_low) = coordinates of vertex with lowest y coordinate
        (xH, y_high) = coordinates of vertex with highest y coordinate
        // find the new location for the label
        if ( frac_inside > LABEL_MIN_FRACTION_INSIDE
parameter of label i ) {
            if ( 2D type movement for label i ) {
                (xMove2D, yMove2D) = (0, 0)
                // If both conditions are true, the label will not fit into the
map.
                if ( x_low < 0 ) {
                    xMove2D = 0 − x_low
                }
                else if ( x_high > map_x_size − 1 ) {
                    xMove2D = map_x_size − 1 − x_high
                }
                // If both conditions are true, the label will not fit into the
map.
                if ( y_low < 0 ) {
                    yMove2D = 0 − y_low
                }
                else if ( y_high > map_y_size − 1 ) {
                    yMove2D = map_y_size − 1 − y_high
                }
                // Determine if the label is still within its movement parameters.
                // This means has the label moved too far from its original
position.
                // The original location parameter is never changed. It does not
change
                // because it is always used for comparison to the new position.
                if ( (xMove2D, yMove2D) within label i 2D
                type movement parameters
) {
                    // Determine if the label is still inside the map boundary after
movement.
                    // This is really a test to see if the label is too big to fit in
the map.
                    // Here, a vertex on the map boundary is not outside the map.
                    // This test works because both label and map are convex polygons.
                    for j = first vertex of label i to last vertex of label i
                        label_moved_outside_map = FALSE
                        if ( ( vertex j + (xMove2D, yMove2D) ) of label i is outside map
boundary ) {
                            label_moved_outside_map = TRUE
                        }
                    next j
                    if ( label_moved_outside_map = FALSE ) {
```

-continued

PULL IN THE LABELS FROM THE EDGES OF THE MAP ROUTINE

```
                        set label i flag LABEL_MOVED_INTO_PORTRAIT = TRUE
                        set label i parameter
                        LABEL_NEW_LOCATION = (xMove2D, yMove2D)
                    }
                }
            }
            else { // vector type movement
                count = 0
                // If both conditions are true, the label will not fit into the
map.
                if ( x_low < 0 ) {
                    find a point (x_IP, y_IP) which meets the following requirements
                        contained by a line parallel to the vector type movement
                        contained by a the line x = 0
                        contained by a line also containing (x_low, yL)
                    if ( (x_IP, y_IP) exists ) {
                        xMoveVec[count] = x_IP − x_low
                        yMoveVec[count] = y_IP − yL
                        place in list of possible label movement candidates
                        count = count + 1
                    }
                }
                else if ( x_high > map_x_size − 1 ) {
                    find a point (x_IP, y_IP) which meets the following requirements
                        contained by a line parallel to the vector type movement
                        contained by a the line x = map_x_size − 1
                        contained by a line also containing (x_high, yH)
                    if ( (x_IP, y_IP) exists ) {
                        xMoveVec[count] = x_IP − x_high
                        yMoveVec[count] = y_IP − yH
                        place in list of possible label movement candidates
                        count = count + 1
                    }
                }
                // If both conditions are true, the label will not fit into the map.
                if ( y_low < 0 ) {
                    find a point (x_IP, y_IP) which meets the following requirements
                        contained by a line parallel to the vector type movement
                        contained by a the line y = 0
                        contained by a line also containing (xL, y_low)
                    if ( (x_IP, y_IP) exists ) {
                        xMoveVec[count] = x_IP − xL
                        yMoveVec[count] = y_IP − y_low
                        place in list of possible label movement candidates
                        count = count + 1
                    }
                }
                else if ( y_high > map_y_size − 1 ) {
                    find a point (x_IP, y_IP) which meets the following requirements
                        contained by a line parallel to the vector type movement
                        contained by a the line y = map_y_size − 1
                        contained by a line also containing (xH, y_high)
                    if ( (x_IP, y_IP) exists ) {
                        xMoveVec[count] = x_IP − xH
                        yMoveVec[count] = y_IP − y_high
                        place in list of possible label movement candidates
                        count = count + 1
                    }
                }
                // Can have zero, one, or two possible label movement candidates
                for k = 0 to (count − 1)
                    // Determine if the label is still within its movement parameters.
                    // This means has the label moved too far from its original
position.
                    // The original location parameter is never changed. It does not
change
                    // because it is always used for comparison to the new position.
                    move_distance = magnitude of (xMoveVec[k], yMoveVec[k])
                    if ( move_distance within label i vector type movement parameters
) {
                        // Determine if the label is still inside the map boundary after
movement.
                        // This is really a test to see if the label is too big to fit in
the map.
                        // Here, a vertex on the map boundary is not outside the map.
                        // This test works because both label and map are convex
polygons.
```

```
-continued

PULL IN THE LABELS FROM THE EDGES OF THE MAP ROUTINE for j = first vertex of label i to last vertex of label i
            label_moved_outside_map = FALSE
            if(( vertex j + (xMoveVec[k], yMoveVec[k])) of label i is
outside map boundary) {
                label_moved_outside_map = TRUE
            }
          next j
          if ( label_moved_outside_map = FALSE ) {
            set label i flag
            LABEL_MOVED_INTO_PORTRAIT = TRUE
            set label i parameter
            LABEL_NEW_LOCATION = (xMoveVec[k],
yMoveVec[k])
            break out of loop // go past next k
          }
        }
        next k
      } // end of vector type movement
    }
    if ( label i flag LABEL_MOVED_INTO_PORTRAIT = FALSE ) {
      set label i flag
      LABEL_TOO_MUCH_OUTSIDE_PORTRAIT = TRUE
    }
  } // end if label_inside_map = FALSE
next i
// THIS IS THE START OF ROUTINE 20
// Sort the labels by priority.
// The labels with the highest priorities have the lowest numbers.
// Priorities may be negative numbers.
// Labels may have the same priority.
// After this loop, assume all labels are ordered properly.
Sort labels by priority from the most important label to the least
important label
    and place into a data structure map
// THIS IS THE START OF ROUTINE 30
// Initialize halting criteria variables
priority_range = priority_of_least_important_label –
priority_of_most_important_label
// initialize these two variables to large numbers
previous_collision_score = Very Large Number
previous_previous_collision_score = Very Large Number
iteration_count = 0
slow_change_count = 0
oscillation_count = 0
```

There is a process for comparing labels for overlap that is used several times in this invention. A list of labels has been previously sorted in order of priority, routine 20, where the highest priority label is first on the list. The order of labels with the same priority is interchangeable with among themselves. Starting with the highest priority label, it is compared against every label below it on the list from the second label to the last label in order of priority. Next, starting with the second highest priority label, it is compared against every label below it on the list from the third label to the last label in order of priority. Continuing the process, label n is chosen and compared to every label below it on the list from label n+1 to the last label in order of priority, until the process is exhausted. In this manner, every unique pair of labels is compared in order of priority. This process for the purposes of this application is termed cycling through label pairs.

Figure 7A:
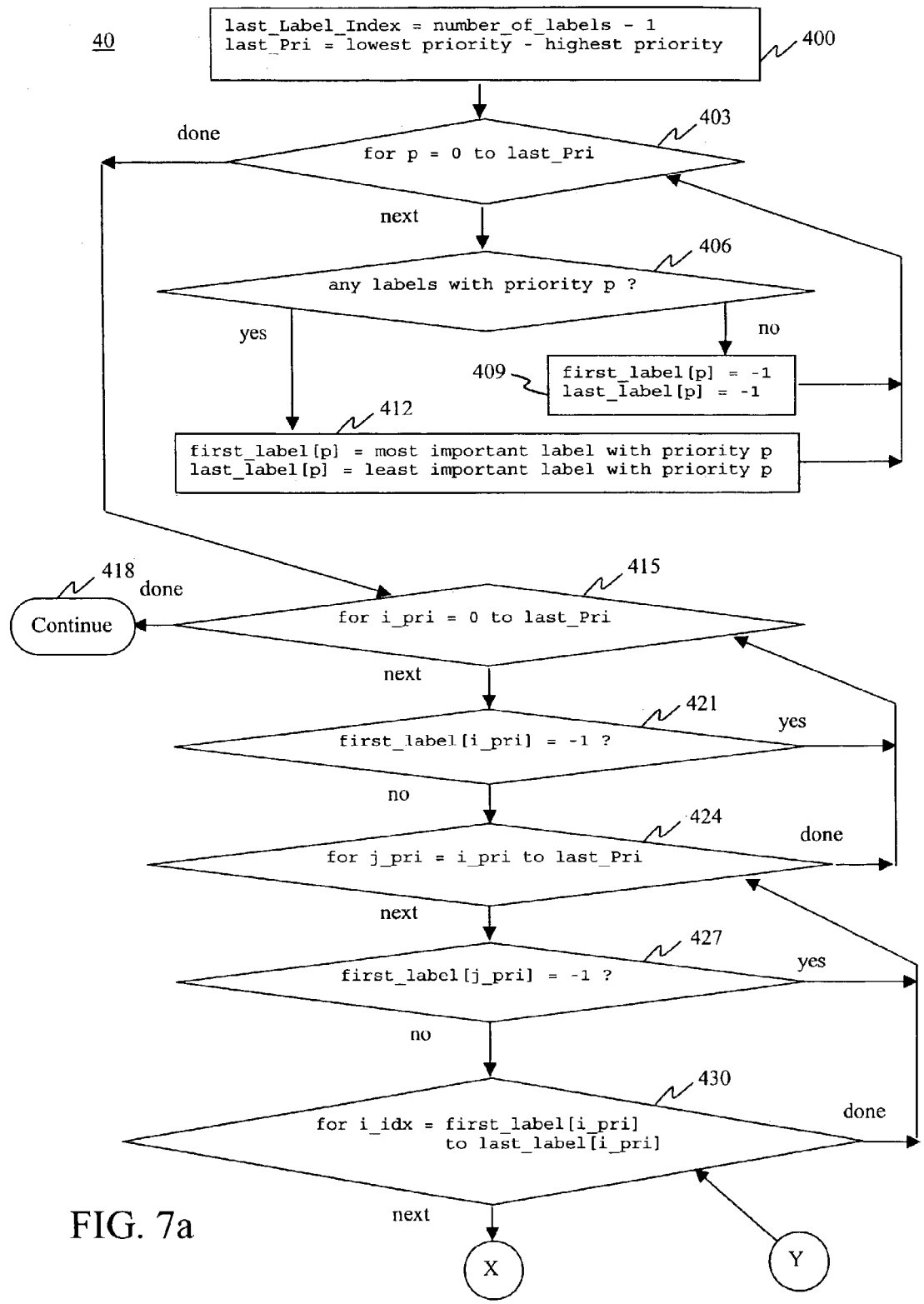
FIGS. 7a and 7b is a flow chart showing the test of whether each label has been tested.
Figure 7B:
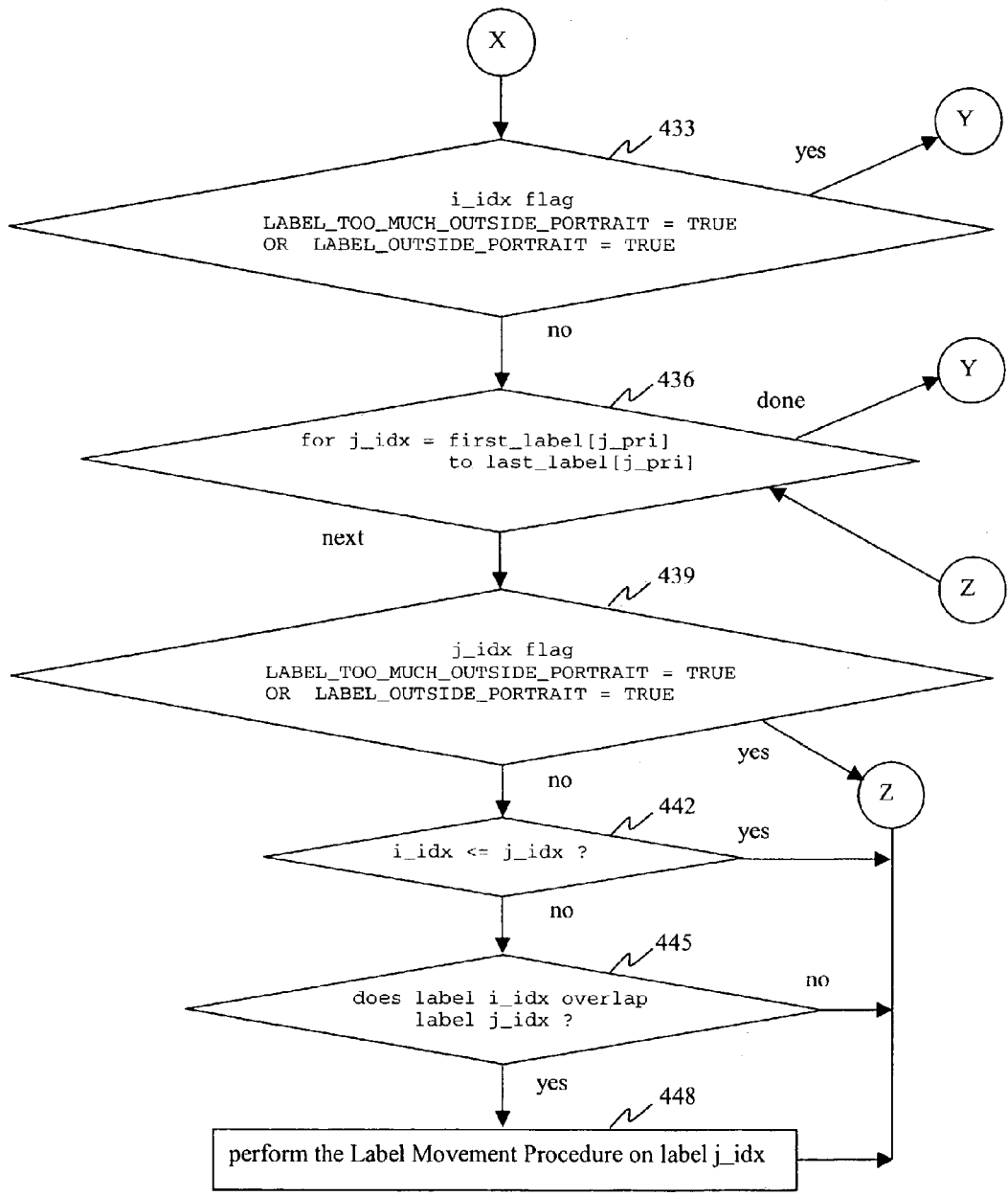

Referring to FIGS. 7a and 7b, labels are compared to determine if they overlap (routine 40). The number of labels and the maximum numerical difference between the highest and lowest priority labels is determined in step 400. All labels are grouped according to priority in steps 403, 406, 409, and 412. It is important to choose the order of comparison properly to avoid excessive calculation and moving labels more times than necessary. Steps 415, 421, 424, 427, 430, 436, and 442 perform cycling through label pairs. If either member of a unique pair obtained by each iteration of the cycling will not be drawn on the map for any reason, steps 433 and 439 continue to the next pair of labels avoiding unnecessary testing with the label that will not be used. Step 445, which corresponds to routine 45, tests for overlap between the members of the pair. Step 448, which corresponds to routine 50, performs the movement procedure on one of the labels if they overlap. Step 418 exits routine 40 and proceeds to routine 60, an evaluation function procedure.

The above-described logic is further shown in the following pseudo-code with comments:

Order of Comparison for the Label Overlap Test Routine

```
// The n labels have already been sorted in priority order,
// from the most important, label 0, consecutively,
// to the least important, label (n – 1).
LABEL_TOO_MUCH_OUTSIDE_PORTRAIT - indicates if the procedure has
determined that the label has much area outside the map boundary or can
not be properly moved to a new position completely inside the map
boundary. This is a flag of every label set by the procedure.
LABEL_OUTSIDE_PORTRAIT - Not used. This is a flag of every label set by
the procedure.
LABEL_MOVED_INTO_PORTRAIT - indicates if the procedure has moved a
label that was originally partially outside the map boundary to a new
position completely inside the map boundary. This is a flag of every
label set by the procedure.
last_Label_Index = number_of_labels – 1; // zero based
// Zero based.
// The highest priority is zero and the lowest priority is a number
greater than zero.
// Note that there may be priorities which have no labels.
last_Pri = lowest priority – highest priority; // which equal the
lowest priority
// Below, if there are no labels with priority p,
// first_Pri[p] = –1 and last_Pri[p] = –1
// first_label[p] = first label index with priority p
// last_label[p] = last label index with priority p
```

-continued

Order of Comparison for the Label Overlap Test Routine

```
for p = 0 to last_Pri; // highest priority to lowest priority
   if labels with priority p exist
      first_label[p] = most important label with priority p;
      last_label[p] = least important label with priority p;
   else
      first_label[p] = -1;
      last_label[p] = -1;
next p;
for i_pri = 0 to last_Pri; // highest priority to lowest priority
   if first_label[i_pri] = -1, continue to next i_pri;
   for j_pri = i_pri to last_Pri; // highest priority to lowest priority
      if first_label[j_pri] = -1, continue to next j_pri;
      for i_idx = first_label[i_pri] to last_label[i_pri];
      if i_idx flag LABEL_TOO_MUCH_OUTSIDE_PORTRAIT = TRUE OR
            LABEL_OUTSIDE_PORTRAIT = TRUE, continue to next i_idx
         for j_idx = first_label[j_pri] to last_label[j_pri];
            // Do not compare a label to itself or
            // compare labels which have been previously compared,
            // for this particular iteration of the entire algorithm.
            if i_idx <= j_idx, continue to next j_idx;
            if j_idx flag LABEL_TOO_MUCH_OUTSIDE_PORTRAIT = TRUE OR
                  LABEL_OUTSIDE_PORTRAIT = TRUE, continue to next j_idx
            if label i_idx overlaps label j_idx,
               then perform the label movement procedure on label j_idx;
         next j_idx;
      next i_idx;
   next j_pri;
next i_pri;
```

All labels are restricted to convex planar polygons in the plane of the map. A planar polygon is convex if it contains all the line segments connecting any pair of its points. If two convex planar polygons overlap, this means that:

1) at least one vertex of one polygon is inside the other polygon, or 2) at least one edge of one polygon intersects an edge of the other polygon.

Figure 8:
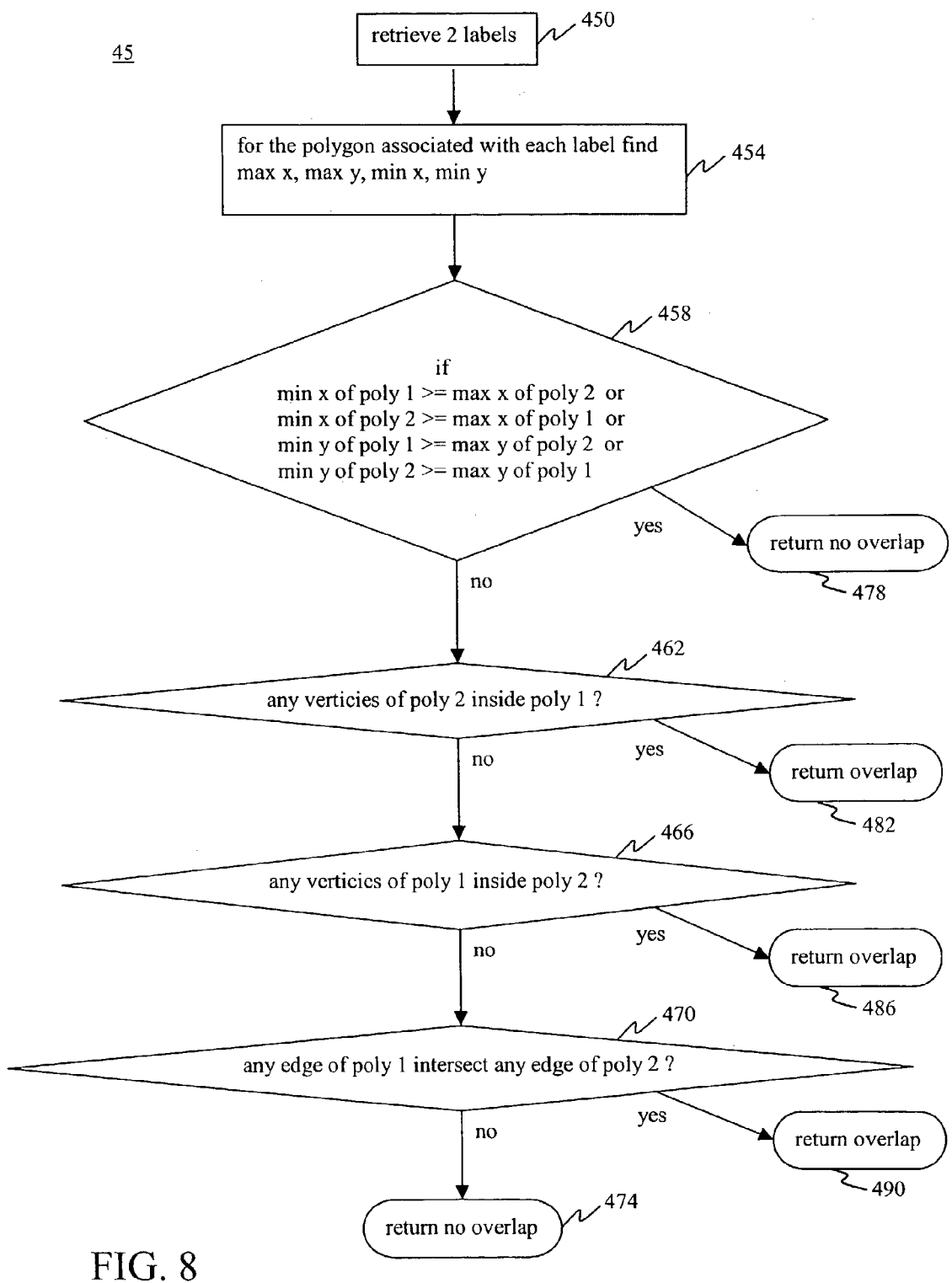
FIG. 8 is a flow chart showing the overlap test

Routine 45, shown in FIG. 8, is a label overlap test procedure. The overlap test has three parts. First, it determines if any vertex of the first polygon is inside the second polygon, step 462. Second, it determines if any vertex of the second polygon is inside the first polygon, step 466. Third, it determines if any edge of the first polygon intersects any edge of the second polygon, step 470. Once any vertex is found to be inside the other polygon, there is no need to test remaining vertices and edges. Once any edge is found to intersect any edge of the other polygon, there is no need to test remaining edges and vertices.

Prior to the overlap test, routine 45 begins by receiving two labels from caller in step 450. In step 454, the maximum and minimum x and y values for each label are determined. These x and y values form circumscribing rectangles, whose edges are parallel to the map's x axis and y axis, for each label. In step 458, the circumscribing rectangles for each label are compared. If these circumscribing rectangles do not overlap, then routine 45 returns "no overlap" to the caller in step 478.

FIG. 8 shows the test for whether a vertex of a polygon is inside another polygon. Consider the standard right-handed two-dimensional Cartesian coordinate system with the positive y direction up and the positive x direction to the right. A first polygon's edges are chosen such that the perimeter is traversed in the counterclockwise (CCW) direction (the perimeter may be traversed in a clockwise direction so long as it is done consistently). At step 462, if any vertex of a second polygon is to the left of all edges of the first polygon, then that vertex is inside the first polygon. Likewise, at step 466, if any vertex of the first polygon is to the left of all edges of the second polygon then that vertex is inside the second polygon. If any vertex of a polygon is inside another polygon, then the polygons overlap. This is the test for a point being inside a convex planar polygon.

Lines containing the edges that make up a polygon may be written, $$(y-Y1)(X2-X1)-(x-X1)(Y2-Y1)=0$$

where (x,y) is any point on the line, and (X1,Y1) and (X2,Y2) are the endpoints of an edge of the polygon under test.

Points lying on the polygon edges satisfy the line equations, while points not on the polygon edges do not satisfy those equations. If (x, y) is any point in the plane, the equation for a line containing an edge is:

$$(y-Y1)(X2-X1)-(x-X1)(Y2-Y1)=K$$

where K is a real number constant.

Then, for all points to the left of any edge, K>0, and for all points to the right of any edge, K<0. Note that point 2 in the above equation is at the head of the vector representing the edge and point 1 is at the tail of the vector representing edge. This is true because, for all edges pointing to the right, (X2−X1)>0. For any point above the line containing the edge, (x_above, y_above), there exists a point, (x,y), on the line, such that:

x_above=x and y_above>y

Therefore:

$$(y - Y1)(X2 - X1) - (x - X1)(Y2 - Y1) =$$
$$(y - Y1)(X2 - X1) - (x - X1)(Y2 - Y1)$$

-continued $$(y\_above - Y1)(X2 - X1) - (x - X1)(Y2 - Y1) >$$
$$(y - Y1)(X2 - X1) - (x - X1)(Y2 - Y1)$$

$$(y\_above - Y1)(X2 - X1) - (x\_above - X1)(Y2 - Y1) >$$
$$(y - Y1)(X2 - X1) - (x - X1)(Y2 - Y1)$$

A point that is above a line pointing to the right is a point that lies to the left of the line. Similar arguments show that any point on the left of lines pointing up, pointing down, or pointing left yields a positive value with substituted into the line equation.

Step 470 tests whether the edges of one polygon intersect another polygon. Consider the equations of the lines that contain the edges of the first polygon and the equations of the lines that contain the edges of the second polygon. Determine the intersection point for every two-line combination, where one line is a line that contains an edge of the first polygon and the other line is a line that contains an edge of the second polygon. If the intersection point lies on or between the endpoints of the polygon edges, then the edge of one polygon intersects the edge of the other polygon and the polygons overlap. In cases where the lines are parallel, and not coincident, no intersection point exists for that pair of lines. If the lines are coincident, then the edges may or may not touch, but if the edges touch then the polygons overlap.

If the three above overlap tests, at step 462, step 466, step 470, find an overlap between the two labels, then routine 45 returns "labels overlap" to the caller in step 482, step 486, and step 490, respectively. If after performed the three tests, there is no overlap between the two labels, then routine 45 returns "no overlap" to the caller in step 474.

The above-described logic is further shown in the following pseudo-code with comments:

---

Pseudo-code for the Overlap Test of Convex Planar Polygons

List of pseudo-code variables
    (x_2_i, y_2_i) - vertex i of polygon 2
    (X1_j, Y1_j) - vertex 1 of edge j of polygon 1
    (X2_j, Y2_j) - vertex 2 of edge j of polygon 1
    (x_IP, y_IP) - intersection point of lines containing edges
x_max_i - max x of edge i
y_min_j - min y on edge j
find max x, max y, min x, min y on polygon 1 - each will be on a vertex
find max x, max y, min x, min y on polygon 2 - each will be on a vertex
// if any expression is true, the polygons do not overlap, so return false
if (min x of polygon 1 >= max x of polygon 2) RETURN NO_OVERLAP
if (min x of polygon 2 >= max x of polygon 1) RETURN NO_OVERLAP
if (min y of polygon 1 >= max y of polygon 2) RETURN NO_OVERLAP
if (min y of polygon 2 >= max y of polygon 1) RETURN NO_OVERLAP
// if any vertex of polygon 2 is inside polygon 1, the result is greater than zero.
// proceed around polygon 1 in the CCW direction for each vertex of polygon 2
for i = first vertex of polygon 2 to last vertex of polygon 2
    inside = TRUE
    for j = first edge of polygon 1 to last edge of polygon 1 in CCW direction
        if((y_2_i - Y1_j) (X2_j - X1_j) - (x_2_i - X1_j) (Y2_j - Y1_j) <= 0)
    inside = FALSE
    next j
    if (inside = TRUE), RETURN OVERLAP
next i

---

Pseudo-code for the Overlap Test of Convex Planar Polygons

Repeat the above, except test polygon 1 vertices with polygon 2 edges
Return OVERLAP if appropriate
// perform the edge intersection test
for i = first edge of polygon 1 to last edge of polygon 1
    of the two endpoints of edge i, get x_max_i, y_max_i, x_min_i, y_min_i
    for j = first edge of polygon 2 to last edge of polygon 2
        of the two endpoints of edge j, get x_max_j, y_max_j, x_min_j, y_min_j
        solve for intersection point, (x_IP, y_IP), of lines containing edge i and edge j
        if intersection point exists
            // An intersection at an endpoint is an overlap.
            // These tests also take care vertical and horizontal edges.
            if (x_IP <= x_max_i and x_IP >= x_min_i) and
                (y_IP <= y_max_i and y_IP >= y_min_i) and
                (x_IP <= x_max_j and x_IP >= x_min_j) and
                (y_IP <= y_max_j and y_IP >= y_min_j),
                RETURN OVERLAP
    next j
next i
RETURN NO_OVERLAP

---

Figure 9A:
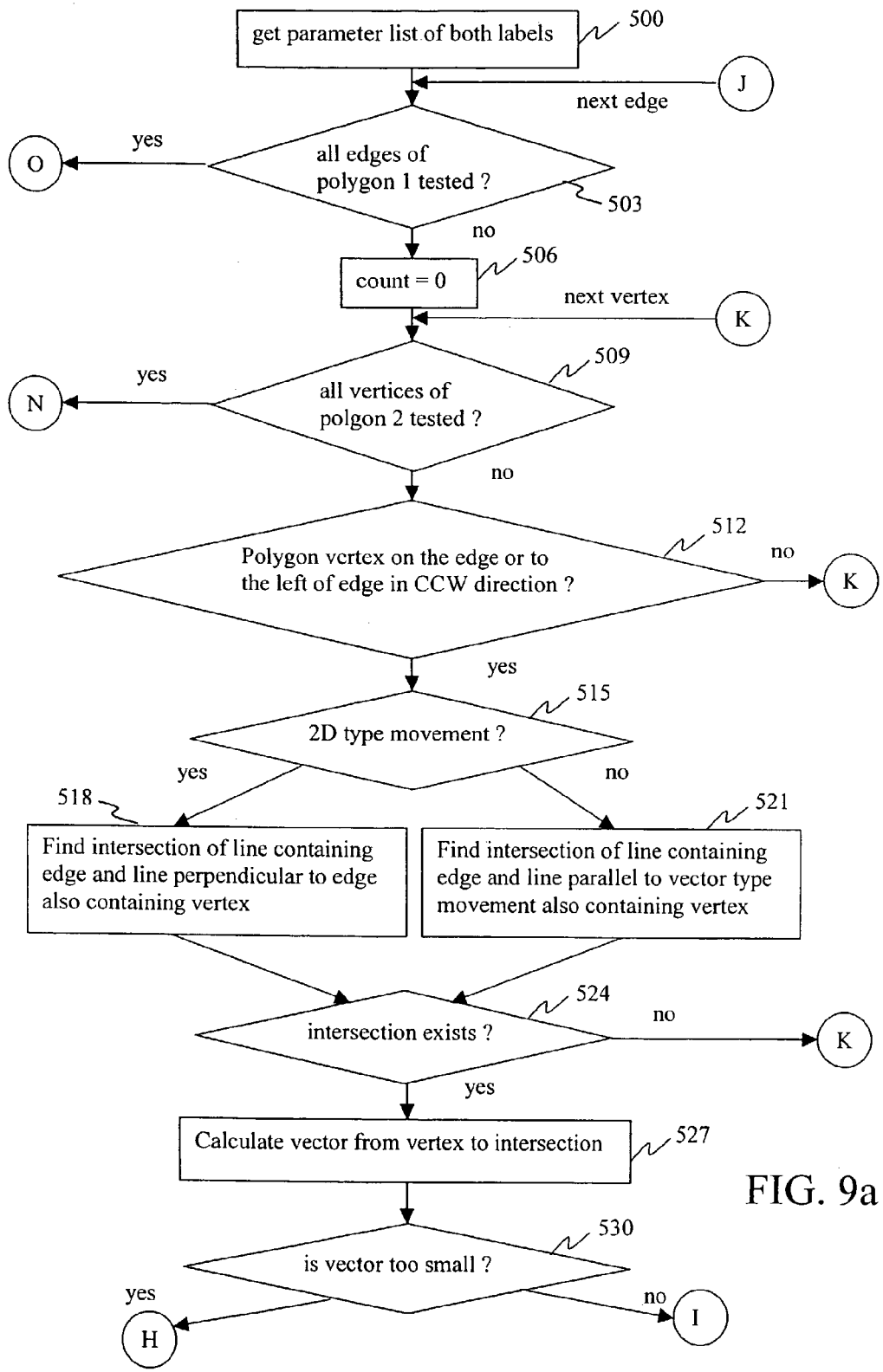
FIGS. 9a, 9b, and 9c is a flow chart showing the movement procedure.
Figure 9B:
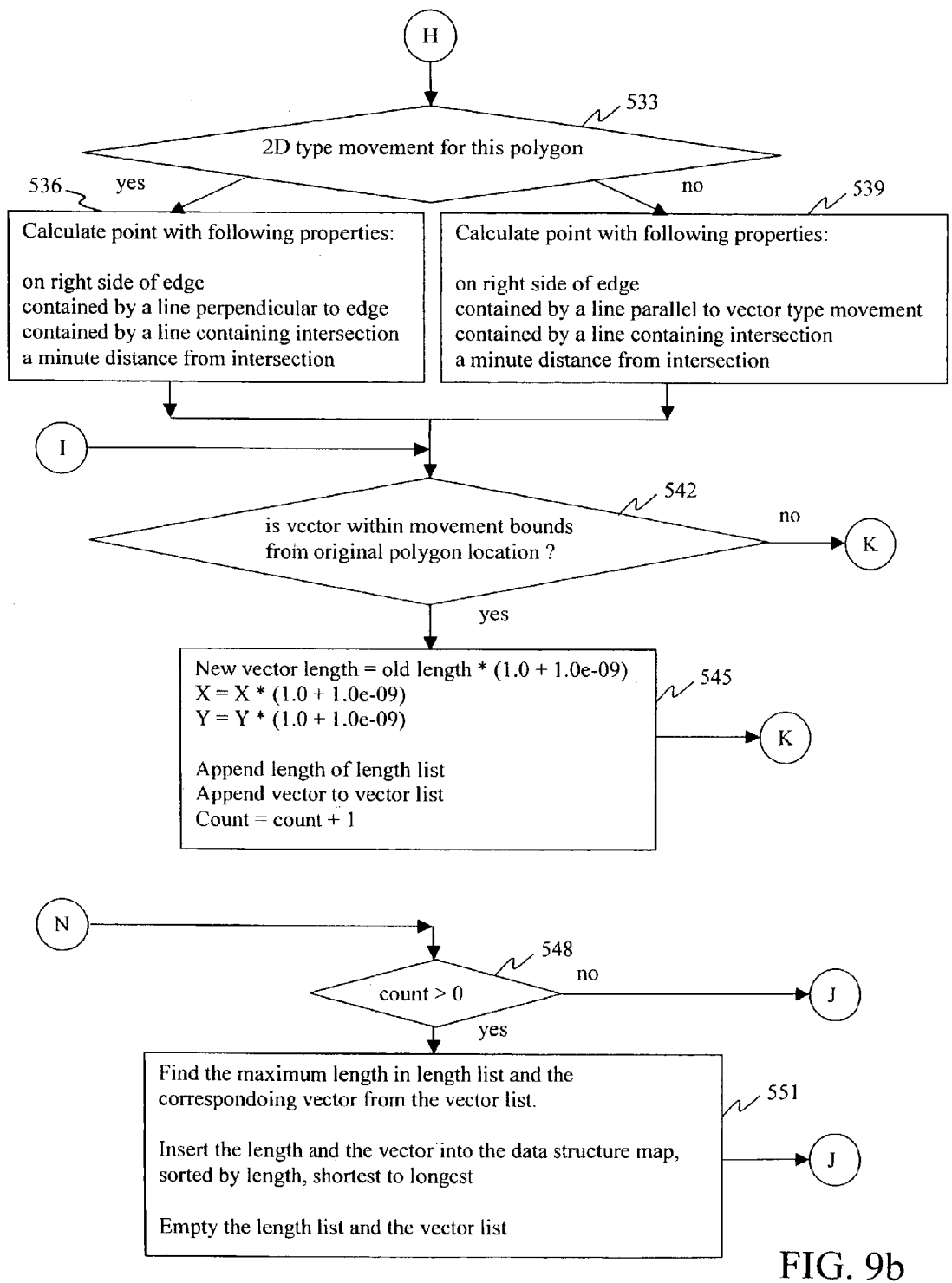
Figure 9C:
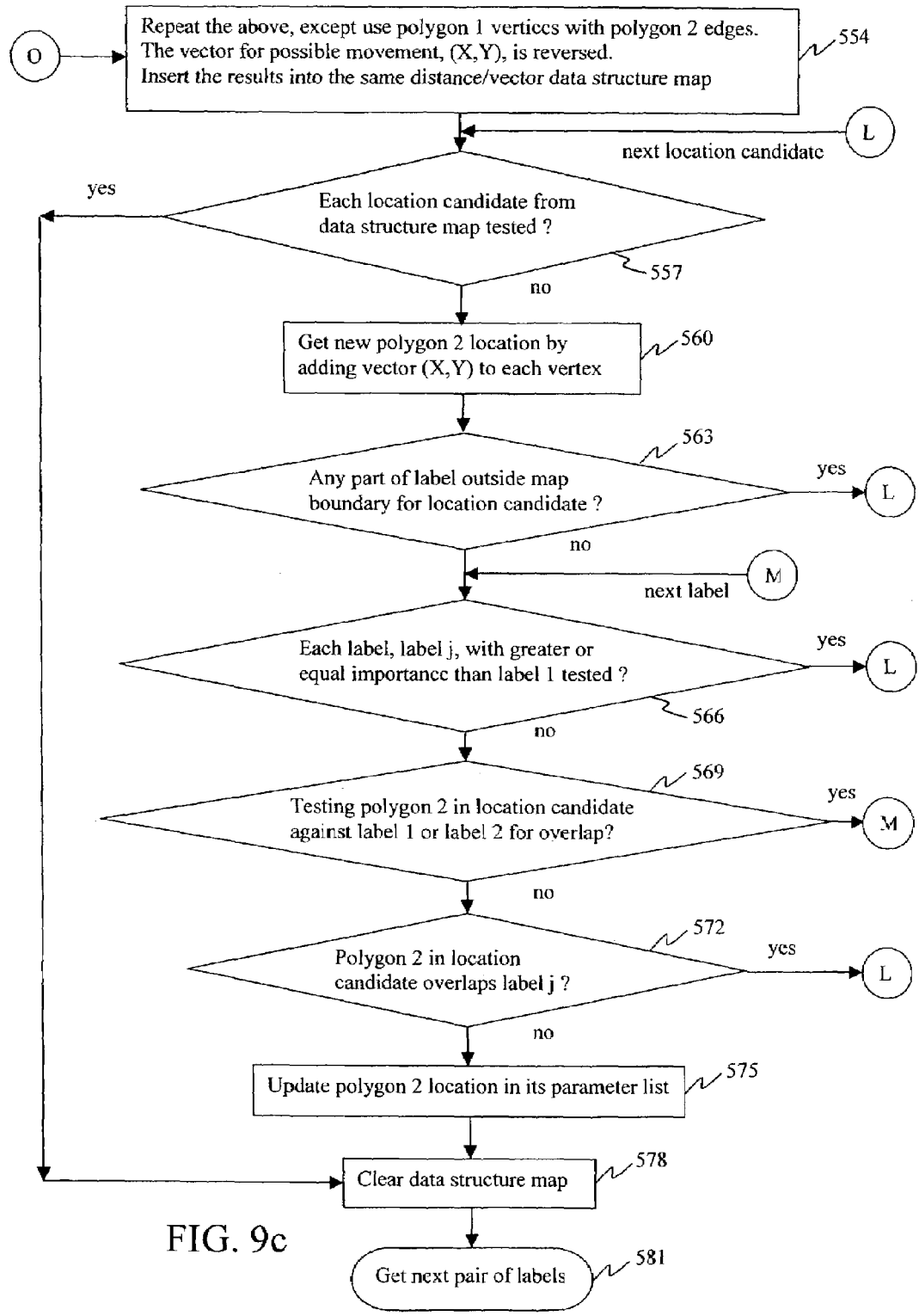

Labels must be moved about the map to clear existing label collisions. After it is determined that two labels overlap, routine 50 (FIGS. 9a, 9b, and 9c) finds several new locations for the lower priority of the two labels that eradicate the existing overlap. The higher priority label is a first label while a lower priority label is a second label. These locations are ranked by how far the second label must be moved, shortest to longest. The actual location finally selected must meet the following criteria:

1) the second label moves a shorter distance than other qualifying locations;
2) the second label movement does not result in overlap with another label (or labels) of equal or higher priority than the first label;
3) the second label movement does not exceed the maximum movement parameters for that particular label; and
4) no part of the second label is moved outside the map boundary.

If no candidate locations meet these criteria, the second label is not moved. During the process of fixing existing collisions, other collisions may be created. New collisions are only allowed if it reduces collisions among labels with priorities equal to or higher than the first label. As the procedure iterates, new collisions are handled like the original collisions. The procedure will minimize collisions.

Each label may be moved in one of two ways. A caller selects the type of movement of a label to the exclusion of the other type of movement. First, a label may move in any direction on the map, up to a maximum distance from the original location. This is referred to as 2D type movement. Second, a label may move parallel to a vector up to a maximum distance from the original location in the positive vector direction or the negative vector direction. This is referred to as vector type movement that may be used for linear features such as highways and rivers. Both the vector and the maximum distances are in the label's parameter list. Labels on a map may consist of any mixture of 2D movement and vector movement types. However, higher priority labels must be examined before lower priority labels regardless of movement type.

Prior to the attempted label movement, routine 50 begins by receiving two labels from caller in step 500. Routine 50 cycles through the edges of first label in step 503 and cycles through the vertices of second label in step 509. A counter is set in step 506. The first label's edges are traversed in a CCW direction. Remembering that these operations take place on a two dimensional map, step 512 tests whether each vertex of the second label is left of a line containing an edge of the first label when the first label is traversed in a CCW direction. A vertex of the second label is said to be on a label side of the line containing the edge of the first label if the vertex of the second label and area of the first label are on the same side of the line containing the edge of the first label. Note that these labels are restricted to convex polygons so all of one label will be on one side of the line containing the label's edge and no part of the label will be on the other side of the line. Likewise, a vertex of a second convex polygon is said to be on a convex polygon side of a line containing an edge of a first convex polygon if the vertex of the second convex polygon and area of the first convex polygon are on the same side of the line containing the edge of the first convex polygon. If step 515 specifies a 2D type movement, then step 518 finds an intersection of two lines. A first line is the line that contains one edge of the first label. A second line is perpendicular the first line and contains the vertex. If, instead, step 515 specifies a vector type movement, then step 521 finds an intersection of a line containing an edge and a line parallel to the vector type movement also containing the vertex.

If in either the 2D type movement case or the vector type movement case, an intersection exists, step 524, and the vertex is on the label side as defined above, step 527 calculates a first vector from the vertex to the intersection. If the first vector is too small, step 530, then the routine 50 calculates, in steps 533, 536, and 539, a second vector with desirable properties listed in steps 536 and 539. In the case that the first vector is too small, the first vector is replaced by the second vector. Whichever vector remains, it is hereafter referred to as the vector.

Step 542 tests whether the vector is within movement bounds from the original label location. If at step 545, it is within bounds, the vector is placed on an end of a list of qualified vectors and a length of the vector is placed on an end of a length list. Once all vertices of the second label are tested, if there any qualified vectors (step 548), then, at step 551:

1) Find the maximum length in the length list and a corresponding qualified vector from the vector list;
2) Insert the length and the qualified vector into a data structure map that is sorted by distance; and
3) Empty the length list and vector list.

After all the edges of the first label are checked, at step 554 the steps starting at step 512 are repeated using the edges of the second label and the vertices of the first label. For any qualifying vectors, a negative of the vector is taken and that vector and its length are inserted into the data structure map.

Next, tests are performed to determine if proposed locations for the second label are acceptable. At step 560, starting with a shortest vector in the data structure map, the second label is moved in both a direction and a length of the shortest vector to obtain a new location for the second label. Then, at step 563, a test is performed to determine if part of the new location for the second label is outside the map boundary. If, the new location for the second label places part of the second label outside the map boundary, repeat steps 557, 560, and 563, using a next vector from the data structure map. Step 566 retrieves labels with priorities greater than or equal to the first label. In step 569, if any retrieved label is the first label or the second label, then retrieve the next label in step 566. At step 572, the overlap test is performed on the current candidate location for the second label against labels that fail tests at step 563 and step 569. If there is an overlap, steps 557 through 572 are repeated. Otherwise, the second label is moved to the candidate location in step 575. After a new location is found for the second label among the proposed locations, or after all proposed locations are determined to be unacceptable, then data structure map is cleared in step 578, and a next pair of labels is supplied in step 581.

The above-described logic is further shown in the following pseudo-code with comments:

Movement Procedure of Convex Planar Polygons

```
// List of pseudo-code variables
    (x_2_j, y_2_j) - vertex j of polygon 2
    (X1_i, Y1_i) - vertex 1 of edge i of polygon 1
    (X2_i, Y2_i) - vertex 2 of edge i of polygon 1
    (x_IP, y_IP) - intersection point of lines containing edge and vertex
    (X,Y) - vector from vertex to edge
pseudo-code also has:
    a list of distances
    a list of vectors
    a data structure map of distances and vectors sorted by distance,
short to long
// Polygon 1 is the more important polygon and polygon 2 will move if
possible
// Here, the vertices in a polygon are on the left side of the edge
// of the other polygon when traversing it in the CCW direction,
// but the vertices are not necessarily inside the other polygon.
// That is why all possibilities are caught in the algorithm below -
// even where no vertex from either polygon is inside the other.
// Do not have to check specifically for the above case.
// If a vertex of polygon 2 is on left side a polygon 1 edge, the
result is greater than zero.
// proceed around polygon 1 in the CCW direction for each vertex of
polygon 2
// Note the the vertex in question does not have to be inside polygon 1
for i = first edge of polygon 1 to last edge of polygon 1 in CCW
direction
    count_of_possible_vertices = 0
    for j = first vertex of polygon 2 to last vertex of polygon 2
        if((y_2_j - Y1_i)(X2_i - X1_i) - (x_2_j - X1_i)
        (Y2_i - Y1_i) > 0)
            if (2D type movement for polygon 2)
            // a solution will always exist for this case
                solve for intersection point, (x_IP, y_IP), of a line containing
edge i
                and a line perpendicular to edge i containing (x_2_j, y_2_j)
            if (vector type movement for polygon 2)
            // a solution might not exist for this case
                solve for intersection point, (x_IP, y_IP), of a line containing
edge i
                and a line parallel to the vector type movement containing (x_2_j,
y_2_j)
            if ( solution exits for (x_IP, y_IP) )
                // get vector from vertex to intersection point
                (X,Y) = (x_IP - x_2_j, y_IP - y_2_j)
                if ( (X,Y) length minute )
                    if ( 2D type movement for polygon 2 )
                        find a point (X,Y) which meets the following requirements
                            on right side of edge i (CCW)
                            contained by a line perpendicular to edge i
                            contained by a line also containing (x_IP, y_IP)
                            a minute distance from (x_IP, y_IP)
                    else // vector type movement for polygon 2
                        find a point (X,Y) which meets the following requirements
                            on right side of edge i (CCW)
                            contained by a line parallel to the vector type movement
                            contained by a line also containing (x_IP, y_IP)
                            a minute distance from (x_IP, y_IP)
                // because polygon may move several times, keep the original
location of the label
                if ( movement of (X,Y) leaves polygon with movement limit )
                // Make vector just a bit larger that the distance to the edge
                // so when polygon 2 is moved, it moves just outside the polygon 1
                    length_of_XY = length of (X, Y) * (1.0 + 1.0e−09)
                    X = X * (1.0 + 10e−09)
                    Y = Y * (1.0 + 10e−09)
                    append length_of_XY to end of distance list
                    append (X,Y) to end of vector list
```

-continued

Movement Procedure of Convex Planar Polygons

```
        count_of_possible_vertices = count_of_possible_vertices + 1
    next j
    if (count_of_possible_vertices > 0)
        find the maximum distance in the distance list
        get the corresponding vector to this distance from the vector list
        insert the distance and the vector into the data structure map sorted
by distance,
            from the shortest distance to the longest distance
        empty distance list and vector list
next i
Repeat the above, except use polygon 1 vertices and with polygon 2
edges
The vector for possible movement, (X,Y), is reversed
Insert the results into the same distance/vector data structure map
// the outer loop is just going thought the sorted data structure map
for i = first location candidate to last location candidate
    get new location for polygon by adding vector (X,Y) to each vertex
    if ( any part of label outside map boundary ) next i
    for j = first label to last label whose priority >= polygon 1
        if ( polygon 1 is label j or polygon 2 is label j) next j
        if ( polygon 2 in location candidate i overlaps label j ) next i
        update polygon 2 location in its parameter list
        break out of both for loops
    next j
next i
clear the data structure map
get the next pair of labels to be tested for overlap
```

The Evaluation Function, the Halting Criteria; and the Adjustment of Label Properties It is probable that the process of label movement will iterate indefinitely, therefore halting criteria are needed. An evaluation function provides input to a halting procedure to stop the process at an acceptable point. The calculation of the evaluation function is represented by FIG. 11. All labels that overlap are known at this point. The procedure used to reduce label collisions is an iterative process. A collision score is a variable that measures the severity of collisions of labels in the map. It is initialized to zero in step 600. Step 605 performs cycling through label pairs. In step 610, each label of the current pair of labels is tested to see if it has too much of its area is outside the map or if it is completely outside the map. This avoids unnecessary calculation for labels that will not be used. The overlap test (routine 45) is performed in step 615. If no overlap occurs between the two labels being tested, then another unique pair of labels is fetched in step 605. If overlap occurs, then the collision score is added to the previous collision score in step 620. The final value of the collision score is attained after all the unique label pairs have been tested. In this anti-collision procedure for maps, the evaluation function at step 620 is:

$$\text{Collision Score} = \sum_{ij} ((\text{label } i \text{ adjusted priority})^2 + (\text{label } j \text{ adjusted priority})^2)$$

where the score is the summation over every pair of overlapping labels. The result of this function is defined as zero if no collisions remain and greater than zero if any collisions remain. The function penalizes disproportionately for collisions involving high priority labels. For instance, a collision involving a high priority label and a low priority label gets a higher score (worse) than a collision involving two medium priority labels.

Figure 12:
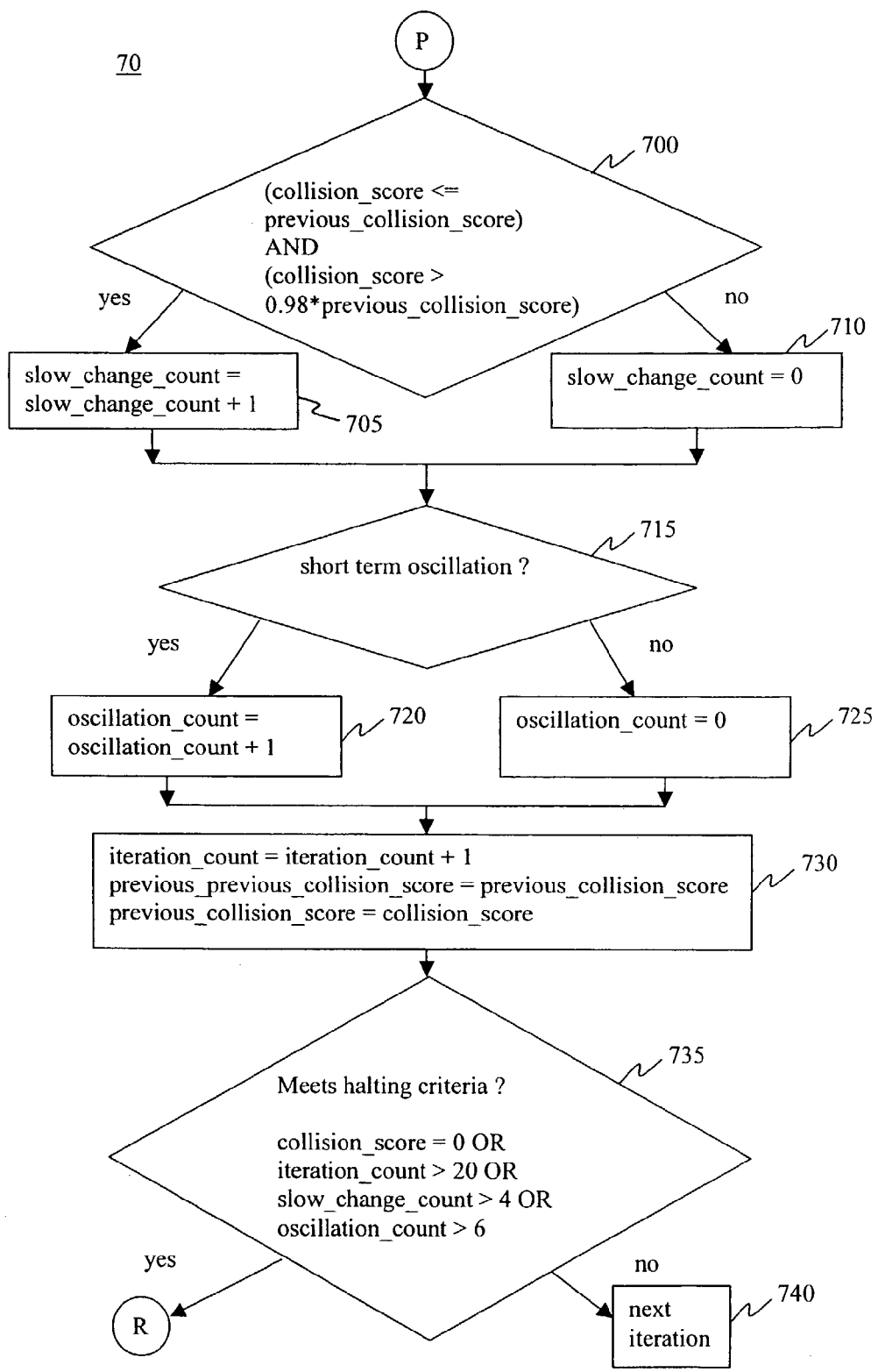
FIG. 12 is a flow chart showing the halt routine.

Routine 70 as shown in FIG. 12 evaluates halting criteria to determine if the labels are in optimal locations. The iterative process must halt at some point. A slow change halting criteria is evaluated in step 700. If the slow change per iteration in the collision score occurs, the slow change count is incremented by one in step 705. If the slow change per iteration does not occur, the slow change variable is reset to zero in step 710. A short-term oscillation halting criteria is evaluated in step 715. If the short-term oscillation in the collision score occurs, the short-term oscillation count is incremented by one in step 720. If the short-term oscillation does not occur, the short-term oscillation count is reset to zero in step 725. The previous values of the collision score are stored in step 730. Step 730 also increments the iteration count by one. Here, an iteration is one cycle of the anti-collision algorithm that includes routines 40, 45, 50, and 60. Example rules tested at step 735 to halt the procedure follow:

1) the evaluation function is below a minimum value;
2) the number of iterations is greater than a maximum value;
3) the evaluation function changes less than a minimum percentage of the previous iteration for more than a set number of iterations; and
4) the evaluation function oscillates for more than a set number of consecutive iterations.

If none of these conditions are meet, the anti-collision algorithm is repeated in step 740, noting that labels may move several times before the iterations stop. A label's new position is stored in its parameter list at the time a label is moved. The original position is always available in the label's parameter list.

Figure 13:
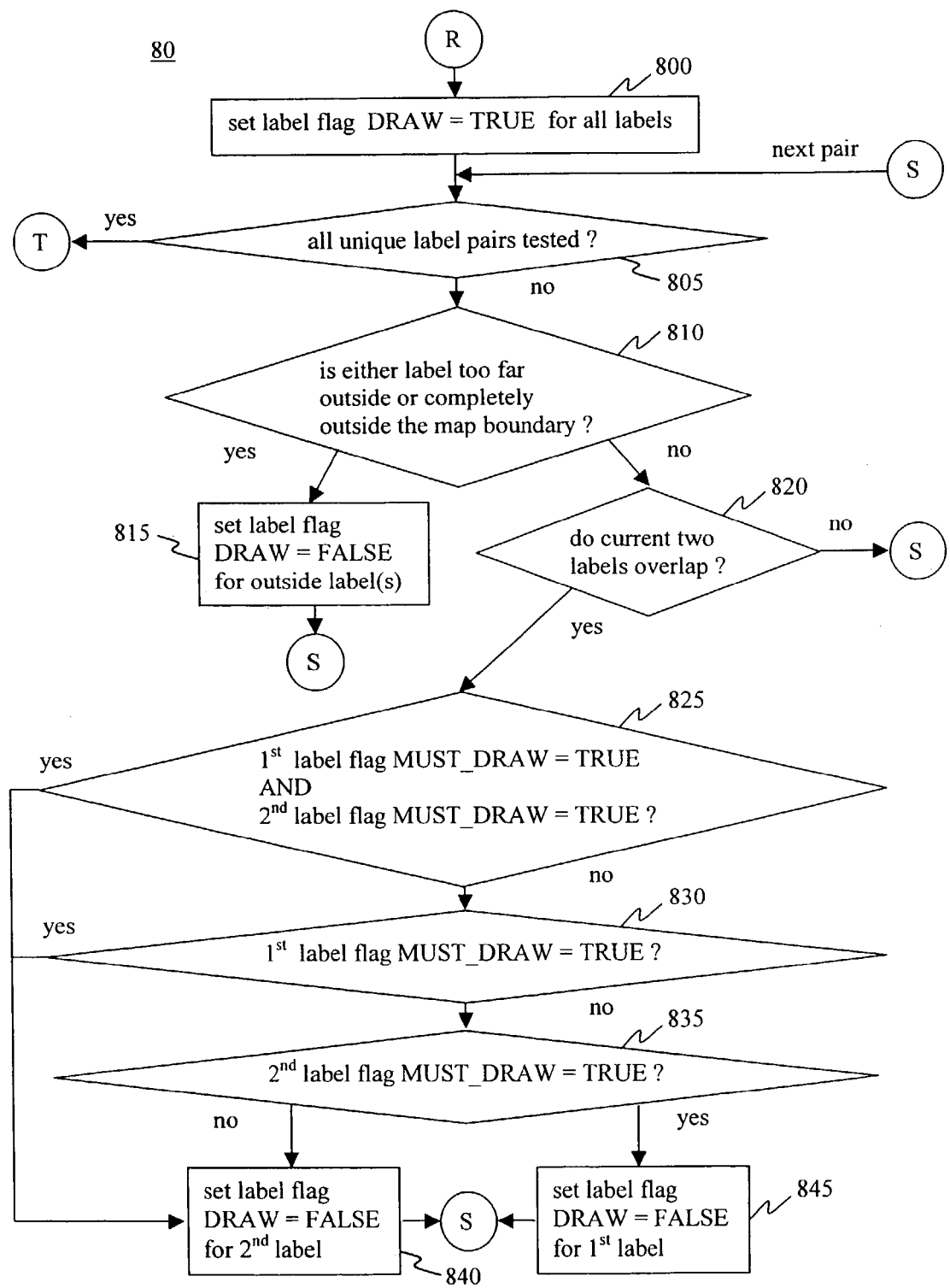
FIG. 13 is a flow chart showing the routine to adjust label properties.

Routine 80, as shown in FIG. 13, adjusts label properties. At this point, labels will not be moved because the halting criteria have been satisfied. However, some labels may still overlap. Routine 80 begins in step 800 by setting the DRAW flag to TRUE for every label. Step 805 cycles through all unique pairs of labels. In step 810, each label of the current pair of labels is tested to see if it has too much of its area is outside the map or if it is completely outside the map. This avoids unnecessary calculation for labels that are not used. Labels that have some or all of their area outside the map have their DRAW flag set to FALSE in step 815. The overlap test (routine 45) is performed in step 820 on those label pairs for which neither have any area outside the map. If no overlap occurs between the two labels being tested, then another unique pair of labels is fetched in step 805. If overlap occurs, then the MUST DRAW flags for both labels are examined in steps 825, 830, and 835. Depending on the result of this examination, the DRAW flag for one of the current labels is set to FALSE in step 840 and step 845. These flags are in the label's parameter list. The MUST DRAW flag is set by the caller. If the DRAW flag is true, this procedure will draw the label. If the DRAW is false, this procedure will not draw the label. For any pair of overlapping labels, the following somewhat arbitrary rules determine the final state of a label's DRAW flag:

1) If one label has MUST DRAW=TRUE, that label sets DRAW=TRUE, and the second label sets DRAW=FALSE.
2) If both labels have MUST DRAW=TRUE, the label higher on the list of label priority sets DRAW=TRUE, and the other label sets DRAW=FALSE. Note that this will hold for labels of equal priority.

3) If neither label has MUST DRAW=TRUE, the label higher on the list of label priority sets DRAW=TRUE, and the other label sets DRAW=FALSE. Note that this will hold for labels of equal priority.

The label priority list and the overlap test are described in preceding sections of the description of the entire anti-collision procedure.

Figure 14:
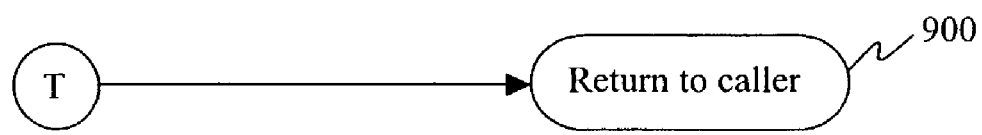
FIG. 14 is a flow chart showing the return to caller.

After label properties are adjusted, control is returned to the caller, in step 900 of FIG. 14.

The above-described logic is further shown in the following pseudo-code with comments.

```
List of pseudo-code variables
collision_score - the sum of the evaluation function after each
iteration
previous_collision_score - the collision score from the previous
iteration
previous_previous_collision_score - the collision score from two
iterations ago
iteration_count - number of times the anti-collision procedure has
looped
slow_change_count - number of iterations of continuous slow change of
collision score
oscillation_count - number of iterations of continuous oscillation of
collision score
priority_of_most_important_label - numerical priority value of the most
important label
priority_range - the difference between the priority of the least and
the most important labels. This number is non-negative.
adjusted_priority_1 - the label 1 priority modified to make it work in
the evaluation function
// Evaluation Function ---------------------------------------------
collision_score = 0
// these loops go thought label priority list
for i = first label to last label
    if( label i flag LABEL_TOO_MUCH_OUTSIDE_PORTRAIT = TRUE OR
       label i flag LABEL_OUTSIDE_PORTRAIT = TRUE ) next i
    for j = label i+1 to last label
      if( label j flag LABEL_TOO_MUCH_OUTSIDE_PORTRAIT = TRUE OR
         label j flag LABEL_OUTSIDE_PORTRAIT = TRUE ) next j
      if( label i and label j overlap )
      {
      // Adjust the label priorities to make the evaluation function work
properly.
      // Note that the highest priority labels are assigned the lowest
numbers and
      // priorities may be positive or negative.
        adjusted_priority_1 = 1 + priority_range –
               ( label_1_priority –
priority_of_most_important_label )
        adjusted_priority_2 = 1 + priority_range –
               ( label_2_priority –
priority_of_most_important_label )
        collision_score = collision_score +
               (adjusted_priority_1) * (adjusted_priority_1) +
               (adjusted_priority_2) * (adjusted_priority_2)
      }
  next j
next i
// Halting Algorithm ------------------------------------
// is there slow change ?
if(collision_score <= previous_collision_score AND
  collision_score > 0.98*previous_collision_score)
{
  slow_change_count = slow_change_count + 1
}
else
{
  slow_change_count = 0
}
// is there oscillation ?
if( (collision_score > previous_collision_score AND
    previous_collision_score < previous_previous_collision_score ) OR
   (collision_score < previous_collision_score AND
    previous_collision_score > previous_previous_collision_score ) )
{
  oscillation_count = oscillation_count + 1
}
else
{
  oscillation_count = 0
```

```
}
iteration_count = iteration_count + 1
previous_previous_collision_score = previous_collision_score
previous_collision_score = collision_score
if(collision_score = 0) goto ADJUST_LABEL_PARAMETERS
if(iteration_count > 20) goto ADJUST_LABEL_PARAMETERS
if(slow_change_count > 4) goto ADJUST_LABEL_PARAMETERS
if(oscillation_count > 6) goto ADJUST_LABEL_PARAMETERS
goto Start of Next Iteration
ADJUST_LABEL_PARAMETERS: //-----------------------------------------
// set label flag DRAW = TRUE for all labels
for i = first label to last label
    label_i_DRAW = TRUE
  next i
// these loops go thought label priority list and set the draw flag
for i = first label to last label
    if( label i flag LABEL_TOO_MUCH_OUTSIDE_PORTRAIT = TRUE OR
        label i flag LABEL_OUTSIDE_PORTRAIT = TRUE )
    {
      label_i_DRAW = FALSE
      next i
    }
    for j = label i+1 to last label
        if( label j flag LABEL_TOO_MUCH_OUTSIDE_PORTRAIT = TRUE OR
            label j flag LABEL_OUTSIDE_PORTRAIT = TRUE )
        {
          label_j_DRAW = FALSE
          next j
        }
        if( label i and label j overlap )
        {
            if ( label_i_MUST_DRAW = TRUE AND label_j_MUST_DRAW = TRUE )
            {
              label_j_DRAW = FALSE
            }
            else if ( label_i_MUST_DRAW = TRUE )
            {
              label_j_DRAW = FALSE
            }
            else if ( label_j_MUST_DRAW = TRUE )
            {
              label_i_DRAW = FALSE
            }
            else
            {
              label_j_DRAW = FALSE
            }
        }
    next j
next i
return to caller
```

While the particular SYSTEM AND METHOD FOR LABELING MAPS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

The invention claimed is:

1. A method for placing a label on a map comprising:
  retrieving the label's association with a respective target feature on the map without regard to other labels or features,
  retrieving map features' properties,
  retrieving labels' properties,
  pulling the label within map boundaries,
  ordering labels in rank of descending priority,
  testing the label for overlap with other labels,
  moving the label, if it overlaps one or more labels of higher or equal priority, where the label may move in any direction in a plane of a map, to a new location on the map,
  eliminating the label if the label cannot be moved to the new location on the map without overlapping other labels of higher priority,
  calculating an evaluation function, and
  adjusting the label properties, wherein moving the label comprises:
assigning the label to be a second label, and selecting one of the one or more labels to be a first label,
  (a) finding a longest vector of vectors that are perpendicular to a line containing an edge of the first label, and that terminate on the line containing the edge, and that begin on each vertex of the second label wherein one of the each vertex is on a label side of the line containing the edge of the first label, guaranteeing that if the second label is moved in both a direction and a length of the longest vector, the second label does not overlap the first label,
  (b) finding a longest vector of vectors that are perpendicular to a line containing an edge of the second label, and that begin on the line containing the edge, and that terminate on each vertex of the first label, wherein one of the each vertex is on a label side of the line containing the edge of the second label, guaranteeing that if the second label is moved in both a direction and a length of the longest vector, the second label does not overlap the first label,
  (c) repeating step a for each edge of the first label, repeating step b for each edge of the second label, and putting the largest vector resulting from each repetition of step a and step b in a data structure map,
  (d) sorting the data structure map by vector length,
  (e) choosing from the data structure map a shortest untested vector while untested vectors remain in the data structure map and continuing, otherwise exiting to caller,
  (f) setting a first flag PASS, a second flag PASS, and a third flag PASS,
  (g) setting the first flag FAIL if a movement of the second label in both a direction and a length of the shortest untested vector, to a new location, would move the second label a greater distance than a chosen maximum distance away from an original second label location,
  (h) repeating step e if the first flag is FAIL,
  (i) setting the second flag FAIL if the movement of the second label would move part of the second label outside a map boundary,
  (j) repeating step e if the second flag is FAIL,
  (k) setting the third flag FAIL if the movement of the second label would cause the second label to overlap any label with priority greater than or equal to that of the first label, and
  (l) repeating step e if the third flag is FAIL,
moving the second label to the new location, if the first flag is PASS, the second flag is PASS, and the third flag is PASS, and
updating a second label final location parameter in a second label parameter list to the new location, if the first flag is PASS, the second flag is PASS, and the third flag is PASS, then exiting to caller.

2. A computer storage medium storing computer executable instructions for performing the method of claim 1.

3. A method for placing a label on a map comprising:
retrieving the label's association with a respective target feature on the map without regard to other labels or features,
retrieving map features' properties,
retrieving labels' properties,
pulling the label within map boundaries,
ordering labels in rank of descending priority,
testing the label for overlap with other labels,
moving the label, if it overlaps one or more labels of higher or equal priority, where a particular label may move parallel to a vector on the map, to a new location on the map,
eliminating labels which cannot be placed on the map without overlapping other labels of higher priority,
calculating an evaluation function, and
adjusting the label properties,
wherein moving the label comprises:
assigning the label to be a second label, and selecting one of the one or more labels to be a first label,
  (a) finding a longest vector of vectors that are parallel to a chosen restricted vector movement, and that terminate on a line containing an edge of the first label, and that begin on each vertex of the second label wherein one of the each vertex is on a label side of the line containing the edge of the first label, guaranteeing that if the second label is moved in both a direction and a length of the longest vector, the second label does not overlap the first label,
  (b) finding a longest vector of vectors that are parallel to a chosen restricted vector movement, and that begin on a line containing an edge of the second label, and that terminate on each vertex of the first label, wherein one of the each vertex is on a label side of the line containing the edge of the second label, guaranteeing that if the second label is moved in both a direction and a length of the longest vector, the second label does not overlap the first label,
  (c) repeating step a for each edge of the first label, repeating step b for each edge of the second label, and putting the largest vector resulting from each repetition of step a and step b in a data structure map,
  (d) sorting the data structure map by vector length,
  (e) choosing from the data structure map a shortest untested vector while untested vectors remain in the data structure map and continuing, otherwise exiting to caller,
  (f) setting a first flag PASS, a second flag PASS, and a third flag PASS,
  (g) setting the first flag FAIL if a movement of the second label in both a direction and a length of the shortest untested vector, to a new location, would move the second label a greater distance than a chosen maximum distance away from an original second label location,
  (h) repeating step e if the first flag is FAIL,
  (i) setting the second flag FAIL if the movement of the second label would move part of the second label outside a map boundary,
  (j) repeating step e if the second flag is FAIL,
  (k) setting the third flag FAIL if the movement of the second label would cause the second label to overlap any label with priority greater than or equal to that of the first label, and
  (l) repeating step e if the third flag is FAIL,
moving the second label to the new location, if the first flag is PASS, the second flag is PASS, and the third flag is PASS, and
updating a second label final location parameter in a second label parameter list to the new location, if the first flag is PASS, the second flag is PASS, and the third flag is PASS, then exiting to caller.

4. A computer storage medium storing computer executable instructions for performing the method of claim 3.

5. A method, on a given two-dimensional plane, of moving a convex polygon, that overlaps one or more convex polygons, wherein moving the convex polygon, where the convex polygon may move in any direction in the plane, to a location where there is no overlap, comprises:

assigning the convex polygon to be a second convex polygon and selecting one of the one or more convex polygons to be a first convex polygon,
- (a) finding a longest vector of vectors that are perpendicular to a line containing an edge of the first convex polygon, and that terminate on the line containing the edge, and that begin on each vertex of the second convex polygon, wherein one of the each vertex is on a convex polygon side of the line containing the edge of the first convex polygon, guaranteeing that if the second convex polygon is moved in both a direction and a length of the longest vector, the second convex polygon does not overlap the first convex polygon,
- (b) finding a longest vector of vectors that are perpendicular to a line containing an edge of the second convex polygon, and that begin on the line containing the edge, and that terminate on each vertex of the first convex polygon, wherein one of the each vertex is on a convex polygon side of the line containing the edge of the second convex polygon, guaranteeing that if the second convex polygon is moved in both a direction and a length of the longest vector, the second convex polygon does not overlap the first convex polygon,
- (c) repeating step a for each edge of the first convex polygon, repeating step b for each edge of the second convex polygon, and putting the largest vector resulting from each repetition of step a and step b in a data structure map,
- (d) sorting the data structure map by vector length,
- (e) choosing from the data structure map a shortest untested vector while untested vectors remain in the data structure map and continuing, otherwise exiting to caller,
- (f) setting a first flag PASS, a second flag PASS, and a third flag PASS,
- (g) setting the first flag FAIL if a movement of the second convex polygon in both a direction and a length of the shortest untested vector, to a new location, would move the second convex polygon a greater distance than a chosen maximum distance away from an original second convex polygon location,
- (h) repeating step e if the first flag is FAIL,
- (i) setting the second flag FAIL if the movement of the second convex polygon would move part of the second convex polygon outside a map boundary,
- (j) repeating step e if the second flag is FAIL,
- (k) setting the third flag FAIL if the movement of the second convex polygon would cause the second convex polygon to overlap any convex polygon with priority greater than or equal to that of the first convex polygon, and
- (l) repeating step e if the third flag is FAIL, moving the second convex polygon to the new location, if the first flag is PASS, the second flag is PASS, and the third flag is PASS, and updating a second convex polygon final location parameter in a second convex polygon parameter list to the new location, if the first flag is PASS, the second flag is PASS, and the third flag is PASS, then exiting to caller.

6. A computer storage medium storing computer executable instructions for performing the method of claim 5.

7. A method, on a given two-dimensional plane, of moving a convex polygon, that overlaps one or more convex polygons, wherein moving the convex polygon, where the convex polygon is restricted to moving parallel to a vector in the plane, to a location where there is no overlap, comprises:

assigning the convex polygon to be a second convex polygon and selecting one of the one or more convex polygons to be a first convex polygon,
- (a) finding a longest vector of vectors that are parallel to a chosen restricted vector movement, and that terminate on a line containing an edge of the first convex polygon, and that begin on each vertex of the second convex polygon wherein one of the each vertex is on a convex polygon side of the line containing the edge of the first convex polygon, guaranteeing that if the second convex polygon is moved in both a direction and a length of the longest vector, the second convex polygon does not overlap the first convex polygon,
- (b) finding a longest vector of vectors that are parallel to a chosen restricted vector movement, and that begin on a line containing an edge of the second convex polygon, and that terminate on each vertex of the first convex polygon wherein one of the each vertex is on a convex polygon side of the line containing the edge of the second convex polygon, guaranteeing that if the second convex polygon is moved in both a direction and a length of the longest vector, the second convex polygon does not overlap the first convex polygon,
- (c) repeating step a for each edge of the first convex polygon, repeating step b for each edge of the second convex polygon, and putting the largest vector resulting from each repetition of step a and step b in a data structure map,
- (d) sorting the data structure map by vector length,
- (e) choosing from the data structure map a shortest untested vector while untested vectors remain in the data structure map and continuing, otherwise exiting to caller,
- (f) setting a first flag PASS, a second flag PASS, and a third flag PASS,
- (g) setting the first flag FAIL if a movement of the second convex polygon in both a direction and a length of the shortest untested vector, to a new location, would move the second convex polygon a greater distance than a chosen maximum distance away from an original second convex polygon location,
- (h) repeating step e if the first flag is FAIL,
- (i) setting the second flag FAIL if the movement of the second convex polygon would move part of the second convex polygon outside a map boundary,
- (j) repeating step e if the second flag is FAIL,
- (k) setting the third flag FAIL if the movement of the second convex polygon would cause the second convex polygon to overlap any convex polygon with priority greater than or equal to that of the first convex polygon, and
- (l) repeating step e if the third flag is FAIL, moving the second convex polygon to the new location, if the first flag is PASS, the second flag is PASS, and the third flag is PASS, and updating a second convex polygon final location parameter in a second convex polygon parameter list to the new location, if the first flag is PASS, the second flag is PASS, and the third flag is PASS, then exiting to caller.

8. A computer storage medium storing computer executable instructions for performing the method of claim 7.

* * * * *